(12) United States Patent
Ihara

(10) Patent No.: US 9,955,044 B2
(45) Date of Patent: Apr. 24, 2018

(54) PRINTER, PRINTING SYSTEM, AND CARD MANUFACTURING METHOD

(71) Applicant: G-PRINTEC INC., Yokohama-shi, Kanagawa (JP)

(72) Inventor: Keiji Ihara, Yokohama (JP)

(73) Assignee: G-PRINTEC INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/216,216

(22) Filed: Jul. 21, 2016

(65) Prior Publication Data

US 2017/0026551 A1 Jan. 26, 2017

(30) Foreign Application Priority Data

Jul. 23, 2015 (JP) ................................. 2015-145827

(51) Int. Cl.
*H04N 1/60* (2006.01)
*G06K 15/02* (2006.01)

(52) U.S. Cl.
CPC ......... *H04N 1/6027* (2013.01); *G06K 15/028* (2013.01)

(58) Field of Classification Search
None
See application file for complete search history.

(56) References Cited

U.S. PATENT DOCUMENTS

| | | | | | |
|---|---|---|---|---|---|
| 5,589,954 | A | * | 12/1996 | Watanabe | H04N 1/407 358/518 |
| 5,887,124 | A | * | 3/1999 | Iwasaki | G06K 15/02 358/1.9 |
| 6,420,091 | B1 | * | 7/2002 | Nakayama | B41C 1/1041 101/453 |
| 6,594,388 | B1 | * | 7/2003 | Gindele | H04N 1/6027 358/520 |
| 9,497,356 | B1 | * | 11/2016 | Pjanic | H04N 1/6097 |
| 2001/0036592 | A1 | * | 11/2001 | Hoshi | B41C 1/1041 430/270.1 |
| 2002/0015928 | A1 | * | 2/2002 | Irving | G03C 1/49809 430/620 |
| 2002/0018967 | A1 | * | 2/2002 | Irving | G03C 1/49881 430/351 |

(Continued)

FOREIGN PATENT DOCUMENTS

JP 3373714 B2 11/2002
JP 4337582 B2 7/2009

*Primary Examiner* — Madelein Nguyen
(74) *Attorney, Agent, or Firm* — Nath, Goldberg & Meyer; Jerald L. Meyer

(57) ABSTRACT

An input unit receives first image data to be printed with a first ink. A luminance value calculator calculates the luminance value of each pixel included in the first image data. A luminance value converter converts the luminance value to a value which is equal to or greater than a previously-set luminance setting lower limit, and is equal to or less than a previously-set luminance setting upper limit. A printing unit prints a first image based on the first image data with the luminance values converted by the luminance value converter on a print body with a first ink, and prints a second image based on second image data on the print body with a glossy second ink to form a glossy image including the first and second images superimposed on the print body.

7 Claims, 24 Drawing Sheets

(56) References Cited

U.S. PATENT DOCUMENTS

| | | | | |
|---|---|---|---|---|
| 2002/0086249 A1* | 7/2002 | Kikuchi | G03C 1/49818 | 430/380 |
| 2002/0110376 A1* | 8/2002 | MacLean | G03B 17/48 | 396/429 |
| 2002/0163640 A1* | 11/2002 | Masuda | G01J 3/46 | 356/402 |
| 2003/0021437 A1* | 1/2003 | Hersch | B41M 3/14 | 382/100 |
| 2003/0156733 A1* | 8/2003 | Zeller | G06T 1/0078 | 382/100 |
| 2004/0156060 A1* | 8/2004 | Ikeda | H04N 1/4092 | 358/1.9 |
| 2005/0128539 A1* | 6/2005 | Takano | H04N 1/6027 | 358/521 |
| 2005/0141002 A1* | 6/2005 | Takano | G06T 5/008 | 358/1.9 |
| 2007/0175998 A1* | 8/2007 | Lev | G06F 17/30876 | 235/454 |
| 2008/0292980 A1* | 11/2008 | Fujita | G03G 5/0542 | 430/57.1 |
| 2009/0233120 A1* | 9/2009 | Maruyama | B32B 17/10018 | 428/612 |
| 2010/0104176 A1* | 4/2010 | Hayase | H04N 1/3871 | 382/162 |
| 2010/0328389 A1* | 12/2010 | Kunimine | B41J 2/2114 | 347/14 |
| 2012/0045246 A1* | 2/2012 | Mitsumori | G03G 9/0819 | 399/159 |
| 2012/0113476 A1* | 5/2012 | Yoshida | H04N 1/6027 | 358/2.1 |
| 2014/0285820 A1* | 9/2014 | Yasukawa | G03G 15/0189 | 358/1.1 |
| 2015/0022832 A1* | 1/2015 | Choulet | H04N 1/54 | 358/1.9 |
| 2015/0069237 A1* | 3/2015 | Yagami | H04N 5/33 | 250/332 |
| 2015/0358646 A1* | 12/2015 | Mertens | H04N 1/6058 | 382/166 |
| 2017/0276476 A1* | 9/2017 | Konno | G01B 11/24 | |

* cited by examiner

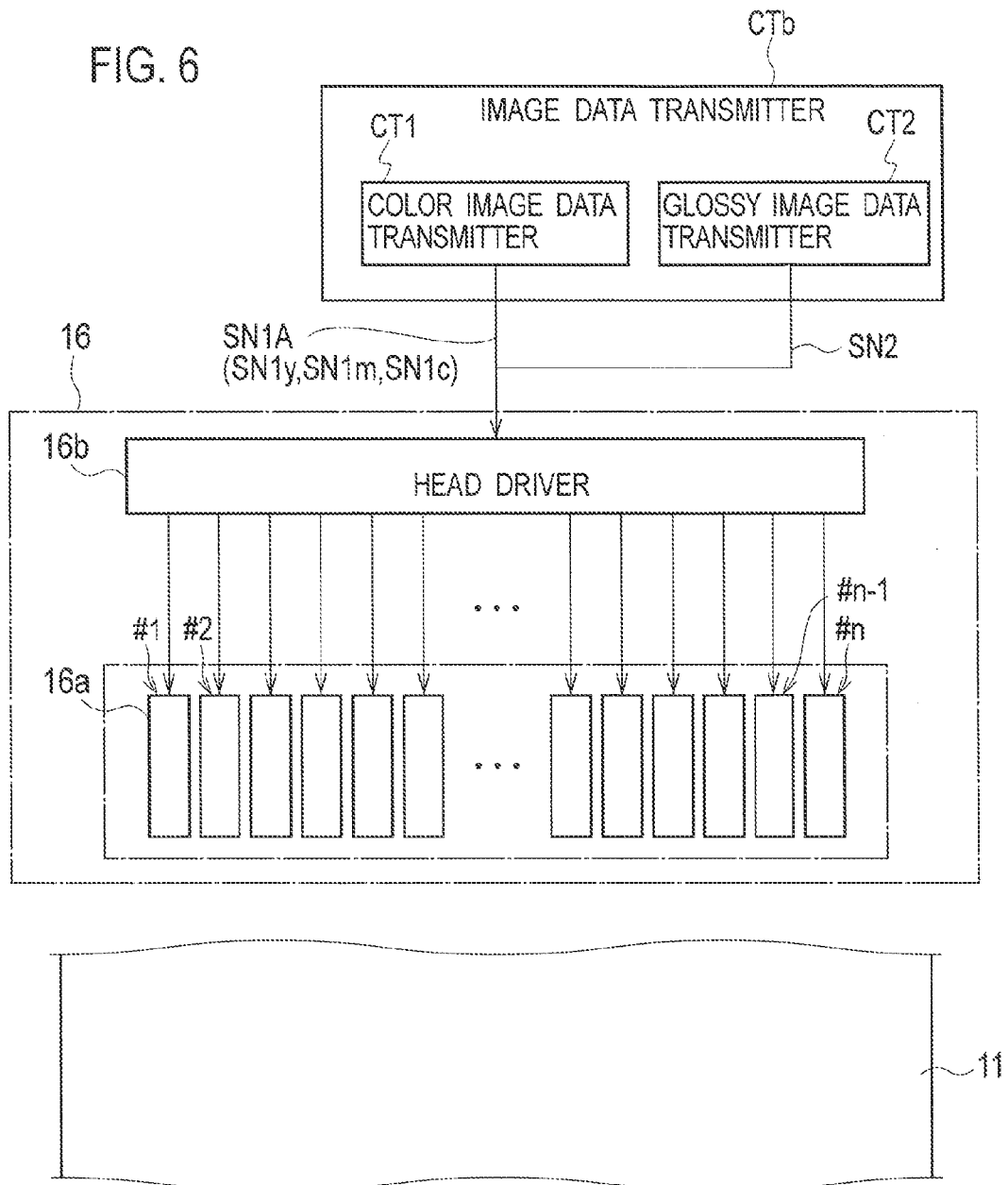

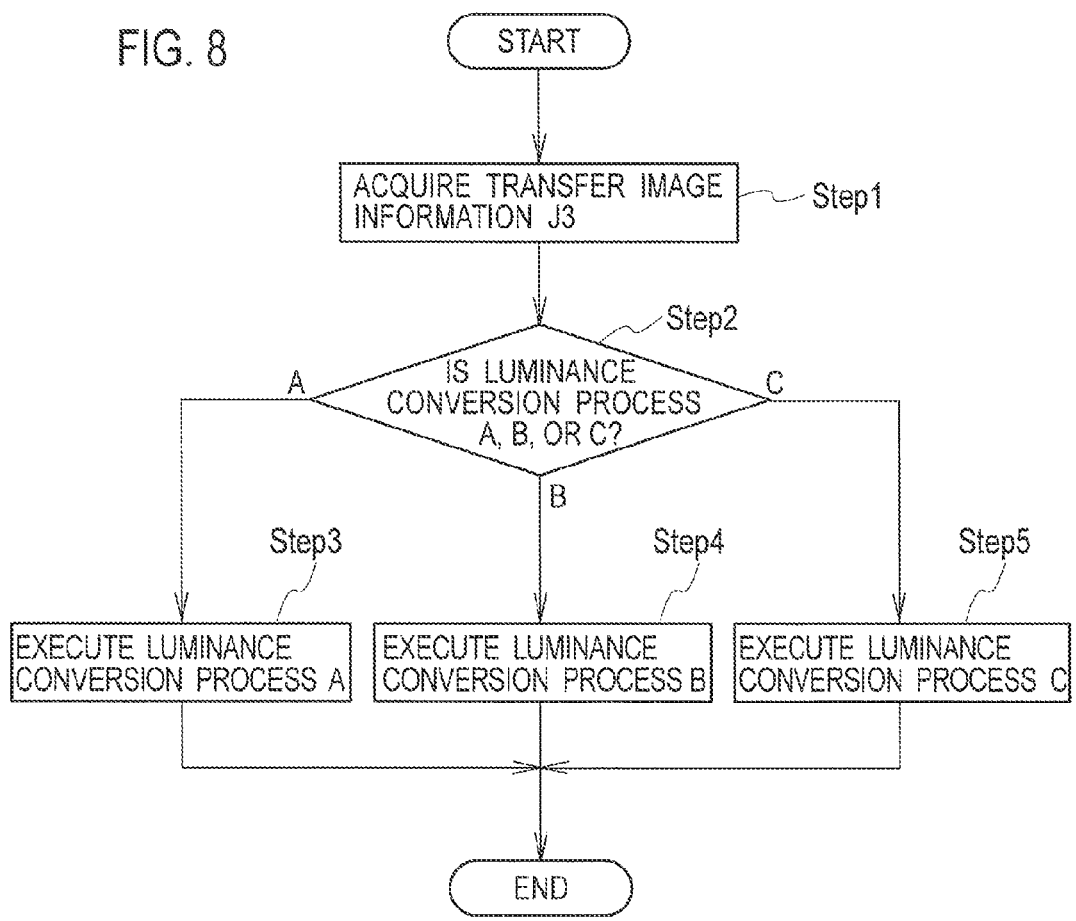

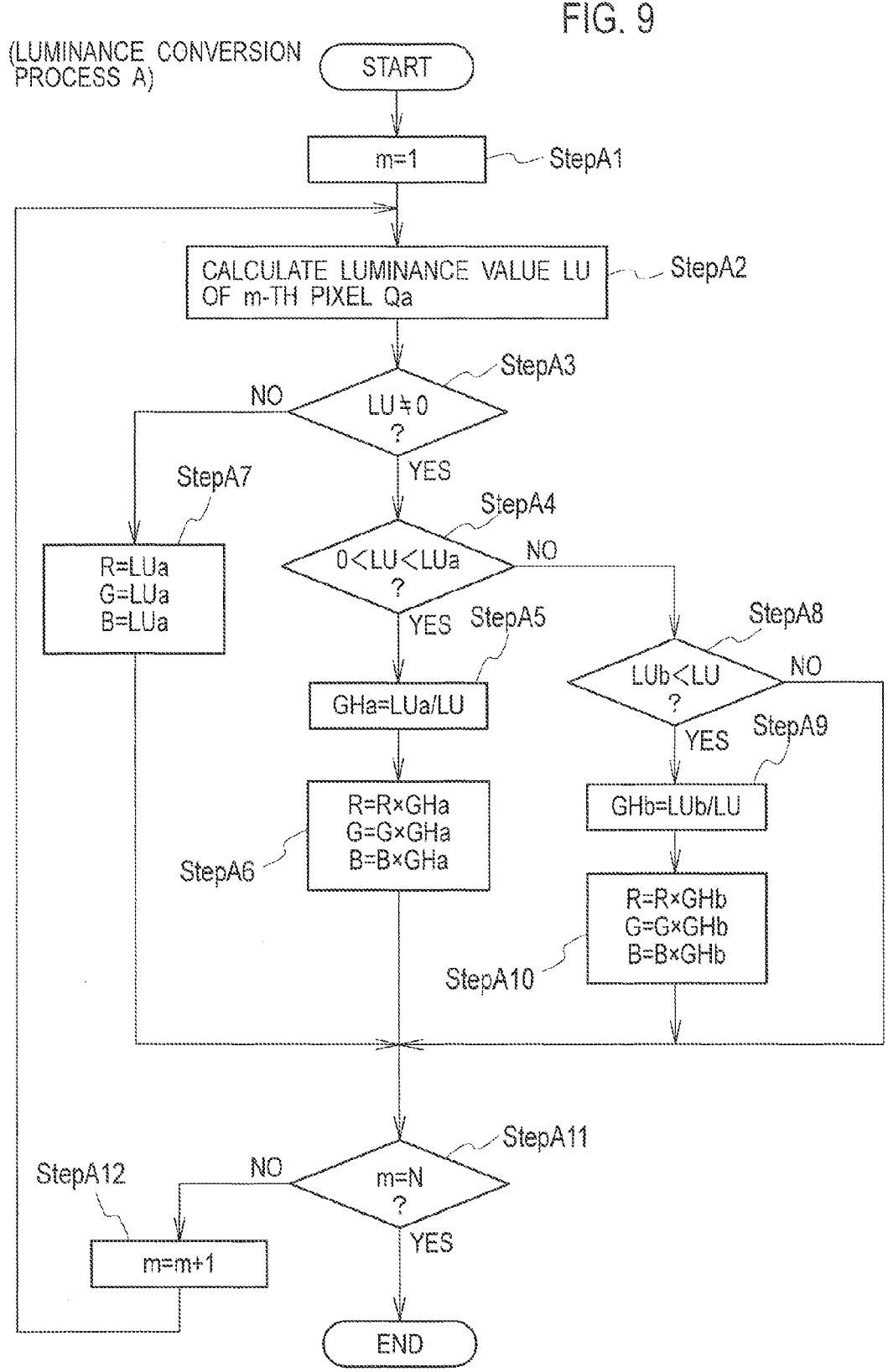

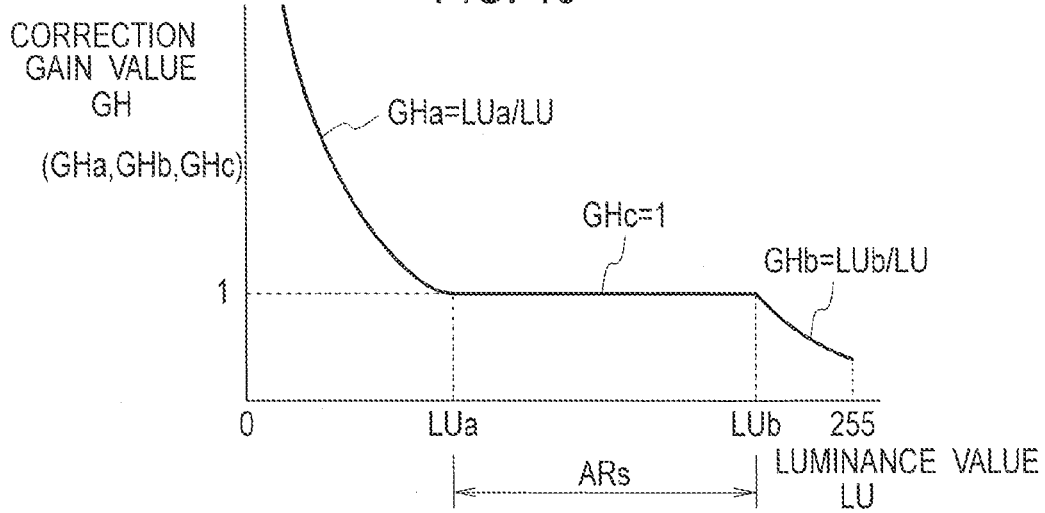

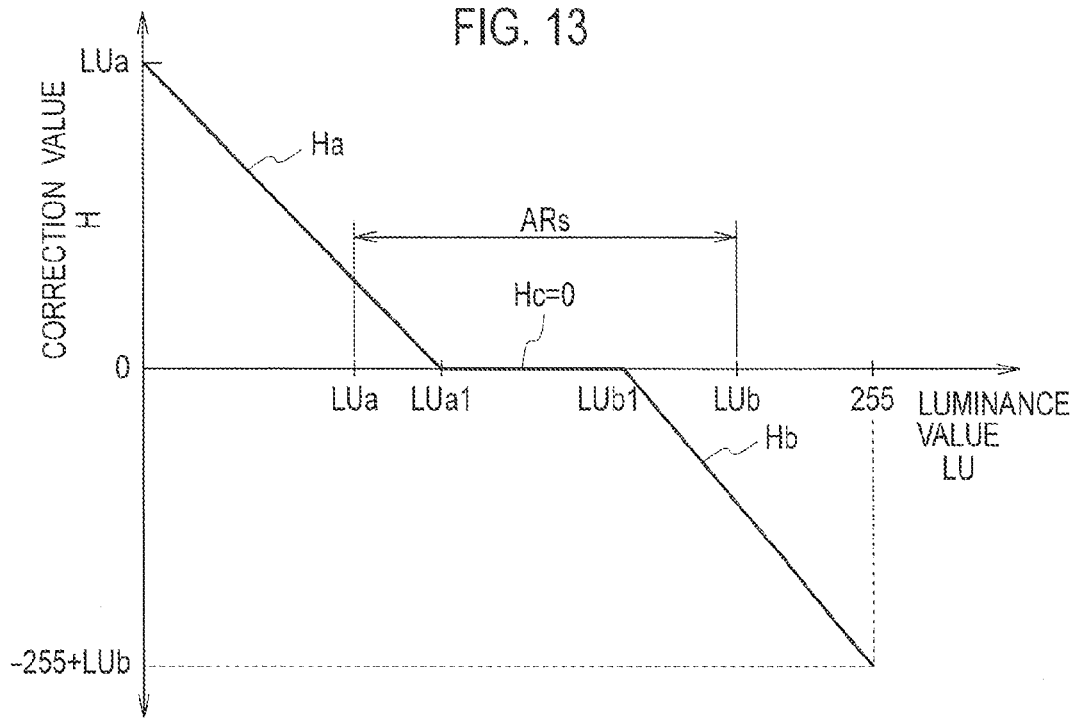

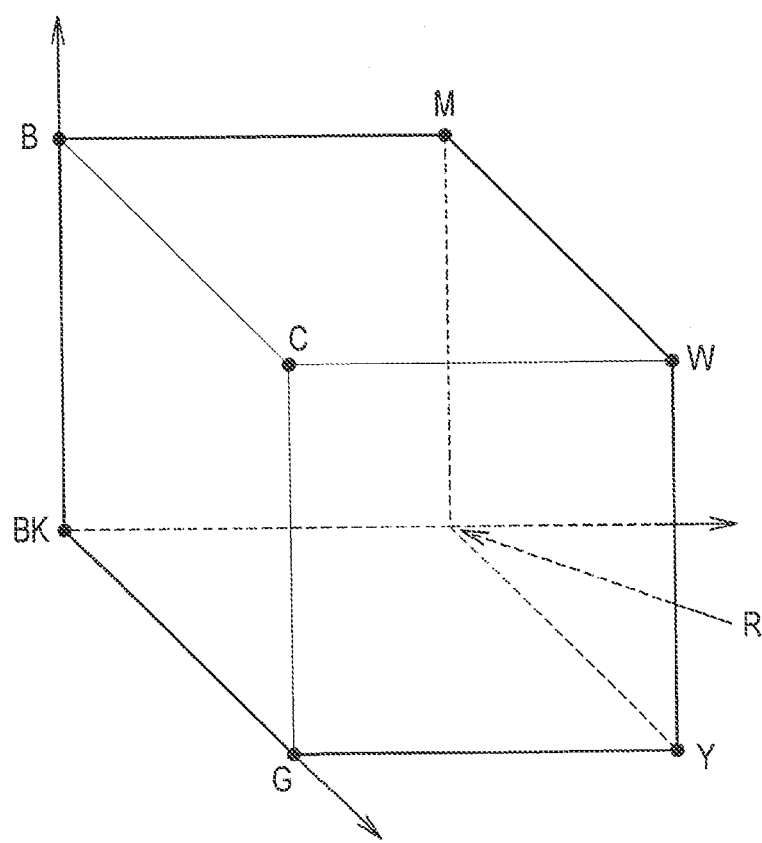

FIG. 16
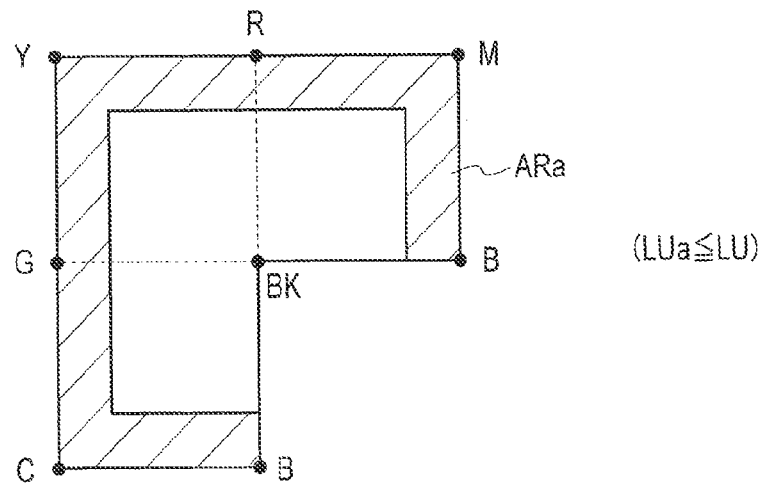
(a) (LUa ≦ LU)
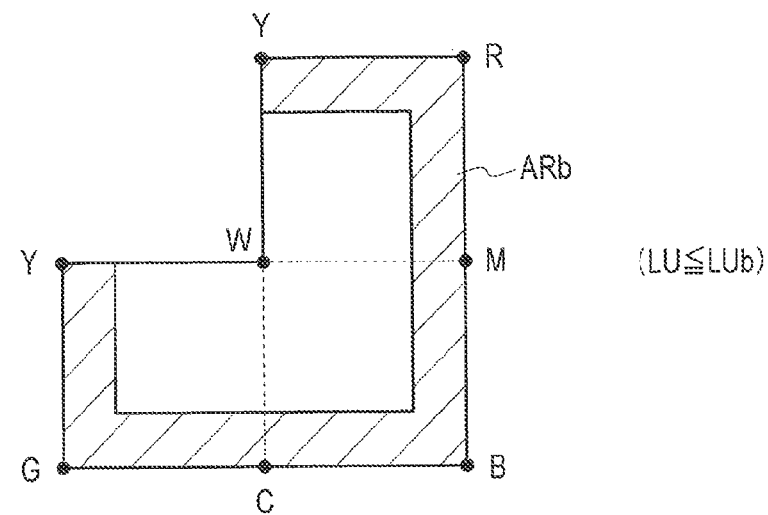
(b) (LU ≦ LUb)
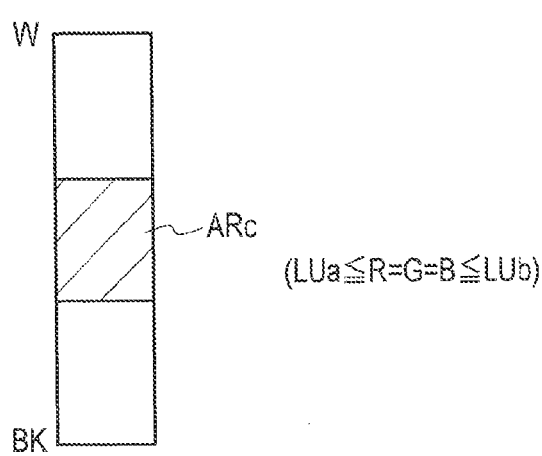
(c) (LUa ≦ R=G=B ≦ LUb)

FIG. 28
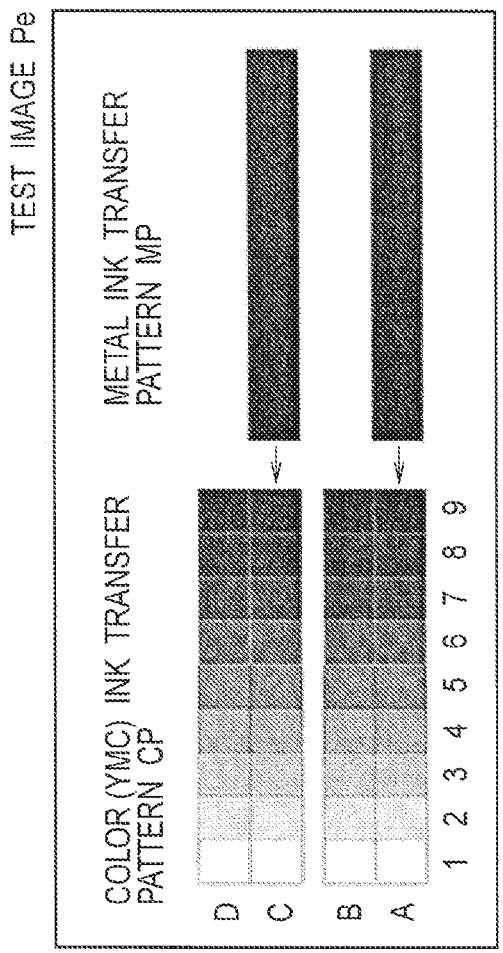
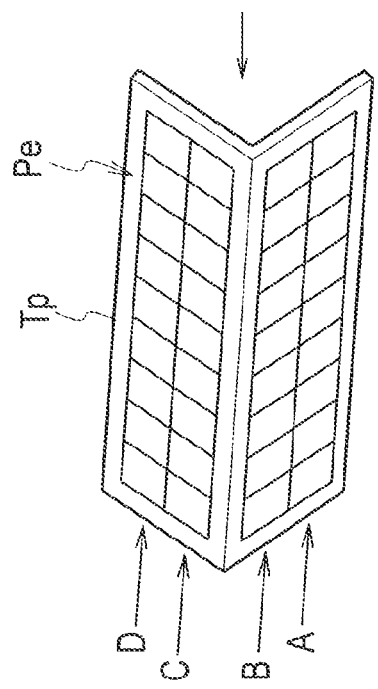

PRINTER, PRINTING SYSTEM, AND CARD MANUFACTURING METHOD

CROSS REFERENCE TO RELATED APPLICATION

This application is based upon and claims the benefit of priority under 35 U.S.C. § 119 from Japanese Patent Application No. 2015-145827, filed on Jul. 23, 2015, the entire contents of which are incorporated herein by reference.

BACKGROUND

The present disclosure relates to a printer and a printing system, which print a glossy color image on a print body using metal ink, and a method of manufacturing a card including a glossy color image printed using metal ink.

As a printer that prints an image on a card, a retransfer device is widely used, which sublimates or fuses ink of an ink ribbon with a thermal head, and transfers the ink to form an image on an intermediate transfer film. The printer again transfers and prints the transferred image onto a card. Japanese Patent No. 4337582 (Patent Document 1) describes such a retransfer device.

In the retransfer device, the ink ribbon includes ink layers of four colors, including yellow (Y), magenta (M), cyan (c), and black (BK), for example. The ink of each ink layer is sequentially transferred and superimposed on the intermediate transfer film to form a non-glossy color image. The formed non-glossy color image is again transferred and printed on a card, so that the color image is formed onto the card.

There is another commonly used technique to form a glossy color image on the surface of a card, by using an ink ribbon including an ink layer of metal ink showing metallic gloss instead of the black ink layer, or as an ink layer of the fifth color to perform the same transfer and retransfer printing as described in Patent Document 1. The metal ink is usually referred to as silver ink.

The technique to form a glossy color image is described in Japanese Patent No. 3373714 (Patent Document 2).

Hereinafter, such non-glossy and glossy color images formed on a card are also referred to as formed images.

SUMMARY

With such cards with a glossy color image formed thereon, the glossy part looks different, depending on the viewing direction. Accordingly, cards with glossy color images can provide special effects, higher security, or other effects, and therefore can attract a lot of attention.

According to the techniques described in Patent Documents 1 and 2, it is possible to provide cards with glossy color images formed at a comparatively low cost. However, the glossy part is difficult to see depending on the viewing direction, and some improvements are required. Very few techniques have been conventionally examined to improve the visual recognition of glossy color images.

A first aspect of the embodiments provides a printer including: an input unit configured to receive first image data; a luminance value calculator configured to calculate the luminance value of each pixel included in the first image data; a luminance value converter configured to convert the luminance value to a value which is equal to or greater than a previously-set luminance setting lower limit and is equal to or less than a previously-set luminance setting upper limit; and a printing unit configured to print a first image based on the first image data with the luminance values converted by the luminance value converter on a print body with a first ink, and to print a second image based on second image data on the print body with a glossy second ink to form a glossy image, including the first and second images superimposed on the print body.

A second aspect of the embodiments provides a printing system including: a printer; and a printer driver configured to send image data to the printer, wherein the printer driver includes: an input unit configured to receive first image data; a luminance value calculator configured to calculate the luminance value of each pixel included in the first image data; and a luminance value converter configured to convert the luminance value to a value which is equal to or greater than a previously-set luminance setting lower limit and is equal to or less than a previously-set luminance setting upper limit; and the printer comprises a printing unit configured to print a first image based on the first image data with the luminance values converted by the luminance value converter on a print body with a first ink, and to print a second image based on second image data on the print body with a glossy second ink to form a glossy image including the first and second images superimposed on the print body.

A third aspect of the embodiments provides a method of manufacturing a card including: calculating the luminance value of each pixel included in first image data; converting the luminance value to a value which is equal to or greater than a previously-set luminance setting lower limit, and is equal to or less than a previously-set luminance setting upper limit; and printing a first image based on the first image data with the luminance values converted on a card material with a first ink, and printing a second image based on second image data on the card material with a glossy second ink to manufacture a card with a glossy image formed thereon, the glossy image including the first and second images superimposed on the card material.

BRIEF DESCRIPTION OF THE DRAWINGS

FIG. 6 is a diagram illustrating the thermal head 16.

FIG. 7 is a diagram illustrating the data structure of each pixel in the color image data SN1.

FIG. 8 is a flowchart illustrating a procedure to select a luminance conversion process in the color image data transmitter CT1.

FIG. 9 is a flowchart illustrating a processing procedure of a luminance conversion process A in the color image data transmitter CT1.

FIG. 10 is a graph illustrating the luminance conversion process A.

FIG. 11 illustrates numeral examples for the luminance conversion process A.

FIG. 13 is a graph illustrating the luminance conversion process B.

FIG. 14 illustrates numeral examples for the luminance conversion process B.

FIG. 15 is an RGB cube illustrating the luminance conversion process.

FIG. 16 illustrates diagrams for the luminance conversion process.

FIG. 28 is a diagram illustrating the test plate TP used to examine the appearance of the metal ink-transferred section Ac.

DETAILED DESCRIPTION

First, a description is given of a printer PR as Example 1 of a printer according to the embodiment with reference to FIGS. 1 to 31.

Example 1

Figure 1:
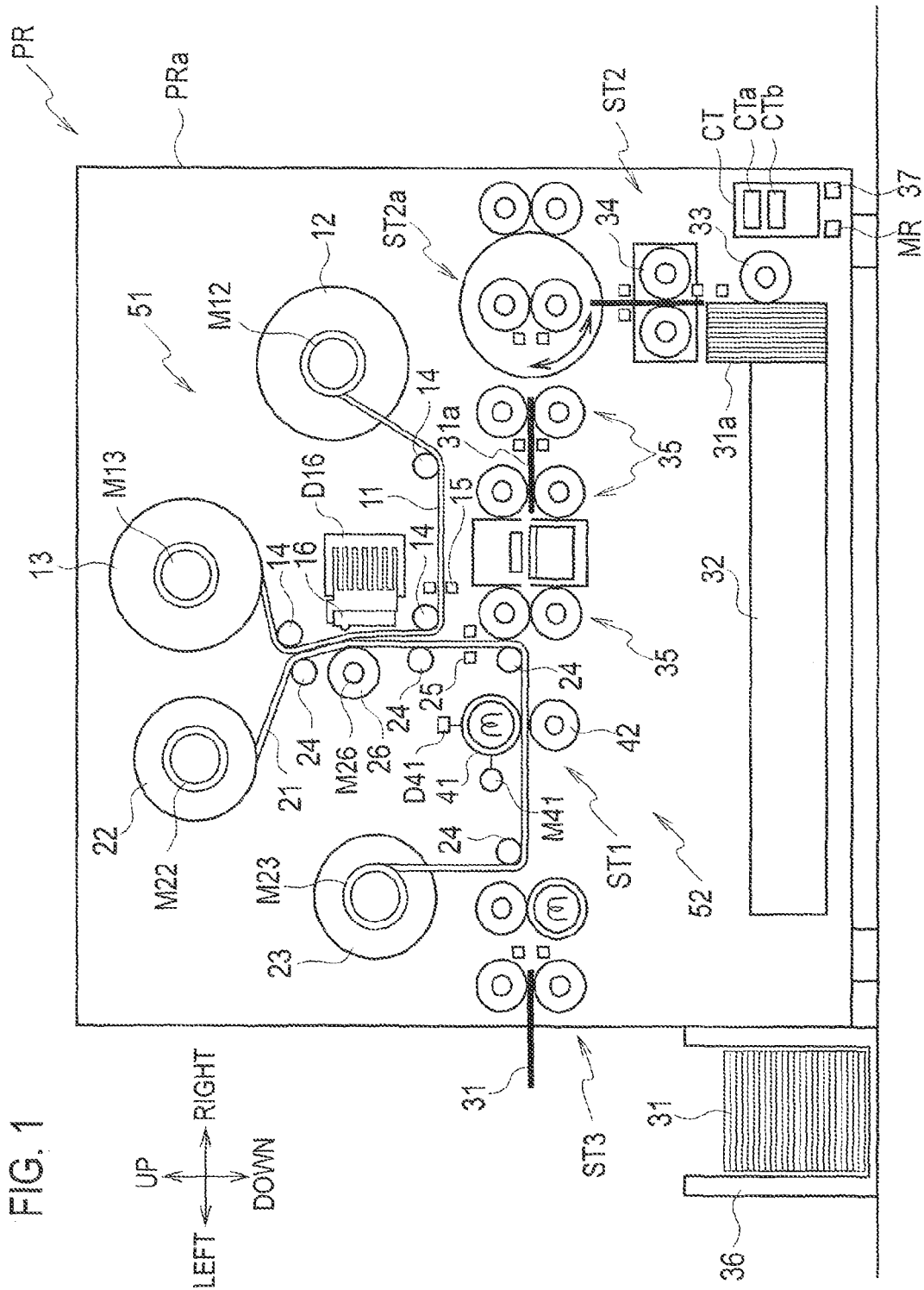
FIG. 1 is a diagram illustrating a printer PR as Example 1 of a printer according to at least one embodiment.

The printer PR of Example 1 is a retransfer printer, a so-called card printer, for example. As illustrated in FIG. 1, the printer PR includes a casing PRa, a transfer device 51, and a retransfer device 52. The transfer and retransfer devices 51 and 52 are accommodated in the casing PRa. The transfer and retransfer devices 51 and 52 constitute a printing unit.

The printer PR transfers ink of the ink ribbon 11 to an intermediate transfer film 21 as a transfer body (a print body) to form an image in the transfer device 51. The printer PR further retransfers the image transferred and formed on the intermediate transfer film 21 to the card material 31a as another transfer body, thus producing a card 31 with the image printed thereon.

The transfer device 51 is provided with the supply reel 12 and the take-up reel 13 for the ink ribbon 11, which are detachably attached to the transfer device 51.

The attached supply and take-up reels 12 and 13 are driven and rotated by the driving motors M12 and M13, respectively. The rotation speeds and directions of the motors M12 and M13 are controlled by the controller CT, which is provided for the printer PR.

The ink ribbon 11 is guided by the plural guide shafts 14 and is laid along a predetermined travel path between the supply and take-up reels 12 and 13.

In the middle of the travel path of the ink ribbon 11, the ink ribbon sensor 15 is provided for cueing. The ink ribbon sensor 15 detects the cue mark 11d (refer to FIG. 3) of the ink ribbon 11, and sends the ribbon mark detection information J1 (refer to FIG. 2) to the controller CT.

Figure 3:
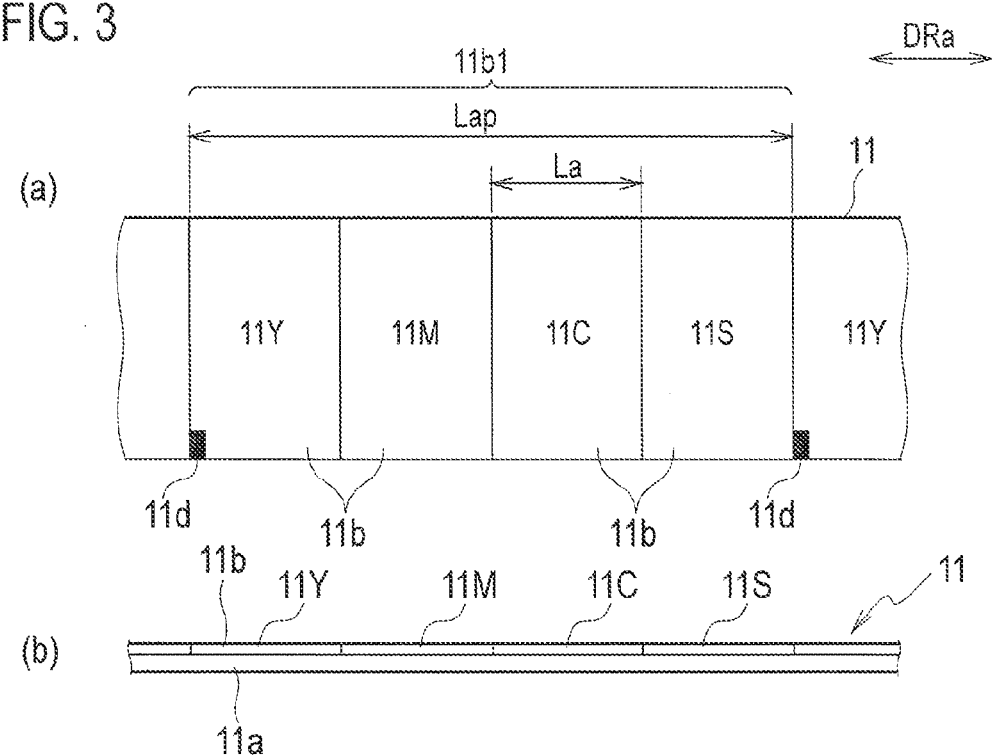
FIG. 3 is a plan view and a side view illustrating an ink ribbon 11 used in the printer PR.
Figure 4:
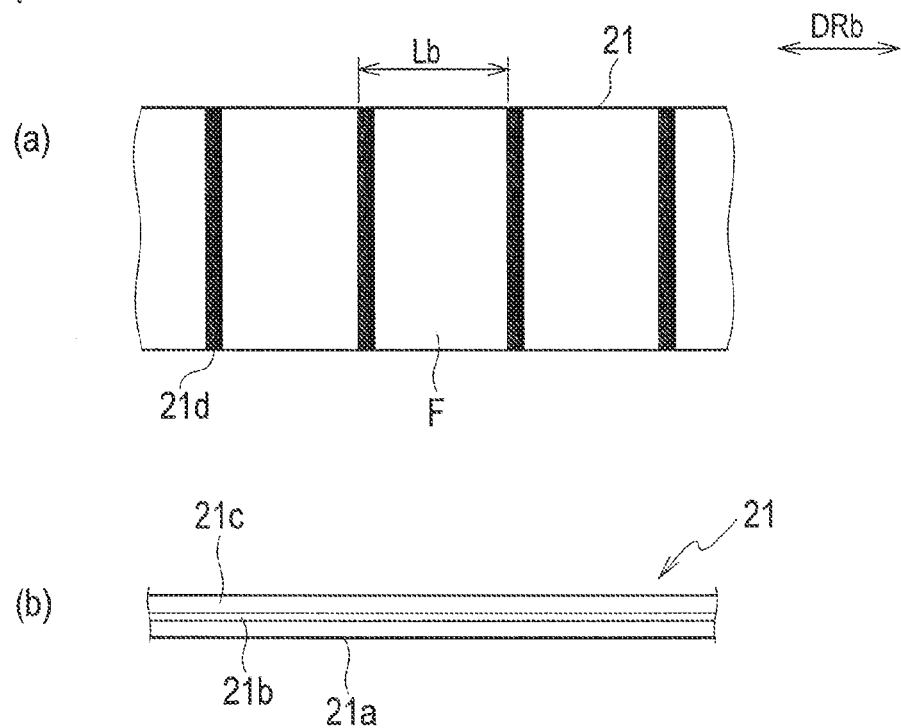
FIG. 4 is a plan view and a side view illustrating an intermediate transfer film 21 used in the printer PR.

As illustrated in FIG. 3, the ink ribbon 11 includes a ribbon base 11a, an ink layer 11Y of yellow ink, an ink layer 11M of magenta ink, an ink layer 11C of cyan ink, and an ink layer 11S of metal ink providing metallic gloss. The ink layers 11Y, 11M, 11C, and 11S are formed on one surface of the ribbon base 11a.

In the following description, each of the yellow, magenta, and cyan inks is referred to as a color ink.

Each color ink is a sublimation ink. The sublimation of each color ink can be controlled by the amount of heat given by the thermal head 16 (to be described later). The lightness and darkness of the transferred image can be represented by density levels. The metal ink is a fusion ink, and the transfer device performs binary processing of whether to transfer the metal ink. The details of the ink ribbon 11 are described later.

In FIG. 1, between the ink ribbon sensor 15 and the take-up reel 13 on the travel path of the ink ribbon 11, the thermal head 16 is provided.

Figure 5:
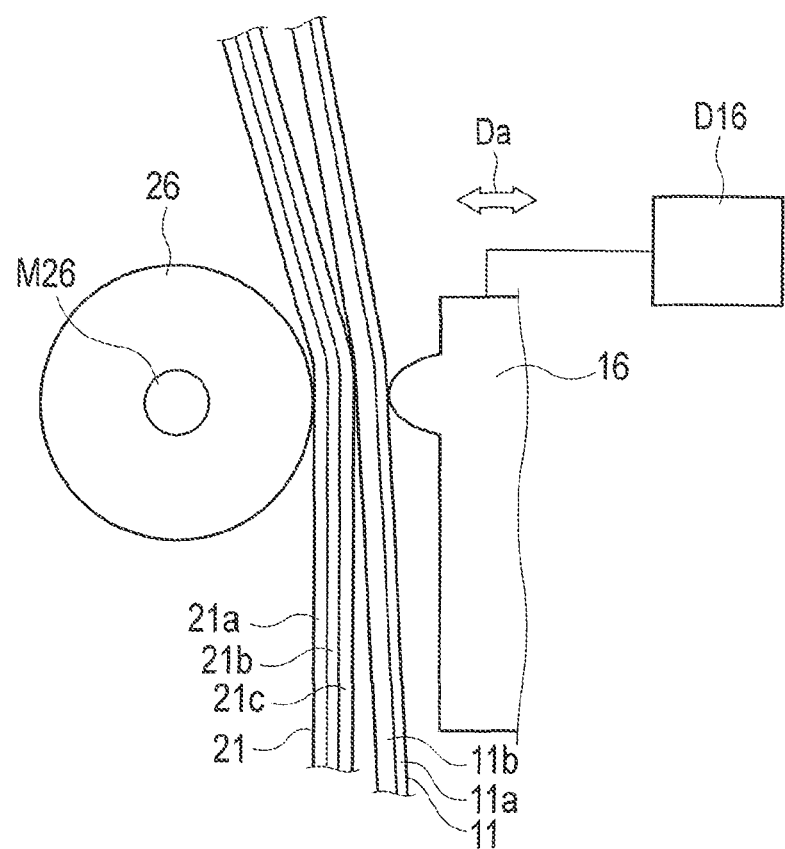
FIG. 5 is a view illustrating a pressure contact between the ink ribbon 11 and intermediate transfer film 21 by the thermal head 16 of the printer PR.
Figure 12:
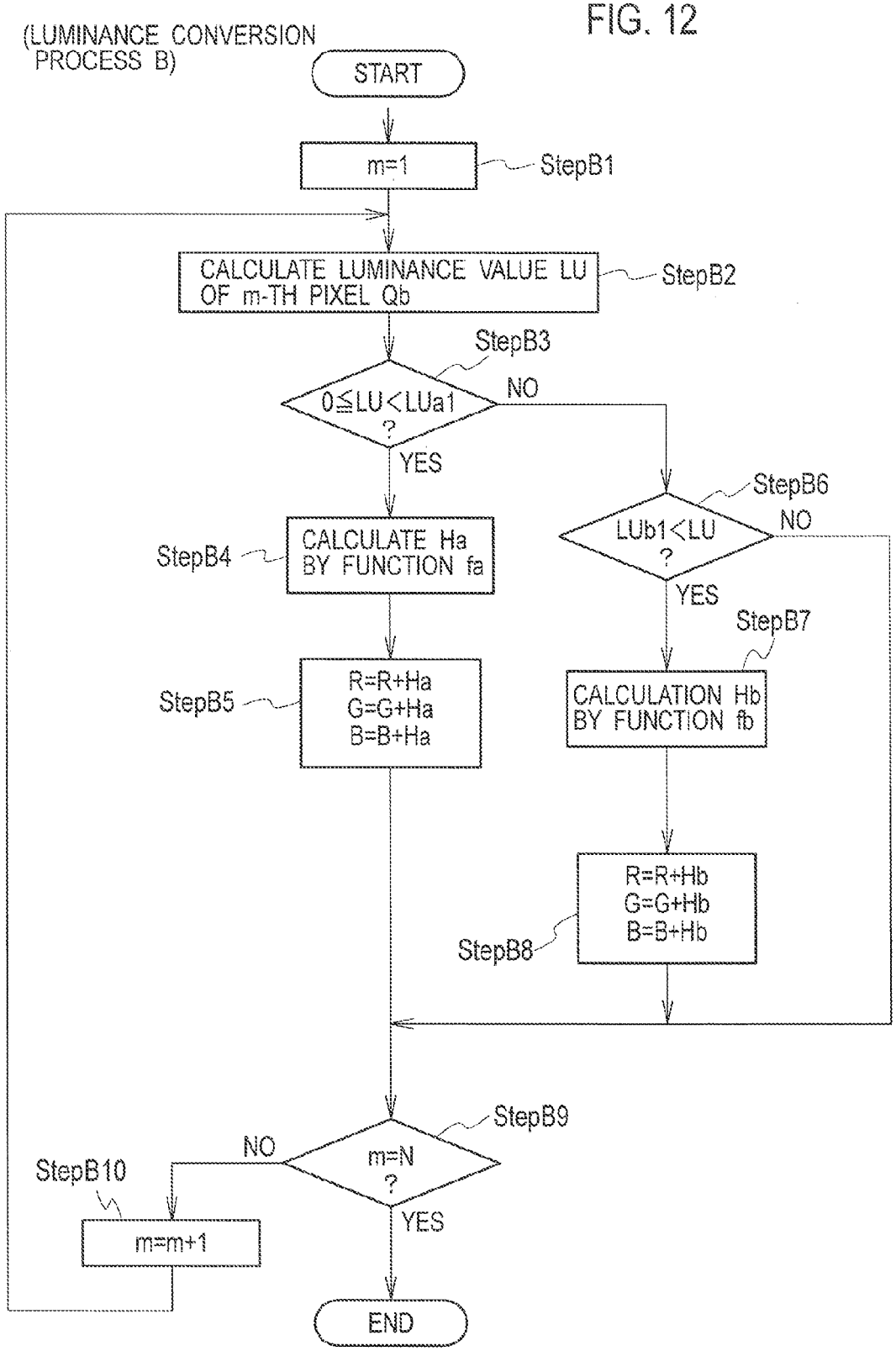
FIG. 12 is a flowchart illustrating a processing procedure of the luminance conversion process B in the color image data transmitter CT1.

The thermal head 16 is configured to contact and separate from the surface (refer to FIG. 3) of the laid ink ribbon 11 on the ribbon base 11a side (in the direction of arrow Da of FIG. 5).

The contacting and separating operation of the thermal head 16 is executed by the head contact and the separation driver D16, under control of the controller CT.

The transfer device 51 is provided with a supply reel 22 and a take-up reel 23 for the intermediate transfer film 21, which are detachably attached to the left of the loaded ink ribbon 11 in FIG. 1.

The attached supply and take-up reels 22 and 23 are driven and rotated by driving motors M22 and M23, respectively. The rotation speeds and directions of the motors M22 and M23 are controlled by the controller CT.

The intermediate transfer film 21 is guided by the plural guide shafts 24, and is laid along a predetermined travel path between the supply and take-up reels 22 and 23.

In the middle of the travel path of the intermediate transfer film 21, a frame mark sensor 25 is provided for cueing. The frame mark sensor 25 detects the frame marks 21*d* (refer to FIG. 4) of the intermediate transfer film 21, and sends frame mark detection information J2 (refer to FIG. 2) to the controller CT.

The intermediate transfer film 21 transmits light. The frame mark sensor 25 is an optical sensor, for example. The frame marks 21*d* are formed so as to block light, and the frame mark sensor 25 detects the frame marks 21*d* based on the difference between the transmission and the blocking of light.

Between the frame mark sensor 25 and the supply reel 22 on the travel path of the intermediate transfer film 21, a platen roller 26, which is driven and rotated by the motor M26, is provided. The rotation speed and direction of the motor M26 are controlled by the controller CT.

As illustrated in FIG. 5, the thermal head 16 contacts and separates from the ink ribbon 11 through the contacting and separating operation by the head contact and separation driver D16. The thermal head 16 and the platen roller 26 need to relatively contact and separate from each other. The platen roller 26 may be configured to perform the operation of contacting and separating from the ink ribbon 11.

To be specific, the thermal head 16 moves between a pressure contact position (as illustrated in FIG. 5) and a separation position (as illustrated in FIG. 1). When the thermal head 16 is at the pressure contact position, it presses the ink ribbon 11 against the platen roller 26 to bring the intermediate transfer film 21 and the ink ribbon 11 into a pressure contact between the thermal head 16 and the platen roller 26. When the thermal head 16 is at the separation position, it is separated from the ink ribbon 11. A later-described transfer is performed while the thermal head 16 is located at the pressure contact position.

The ink ribbon 11 and the intermediate transfer film 21 are configured to be independently rewound by the take-up reels 13 and 23, and are rewound by supply reels 12 and 22 through the operations of the motors M12 and M13 and motors M22 and M23, respectively, while the thermal head 16 is located at the pressure contact position.

The ink ribbon 11 and intermediate transfer film 21, being in close contact with each other, move together toward the supply reels 13 and 23, or the take-up reels 12 and 22. The movement is executed by rotation of the supply reels 12 and 22, the take-up reels 13 and 23, and the platen roller 26, which are driven by the motors M12, M13, M22, M23, and M26 under control of the controller CT.

Figure 2:
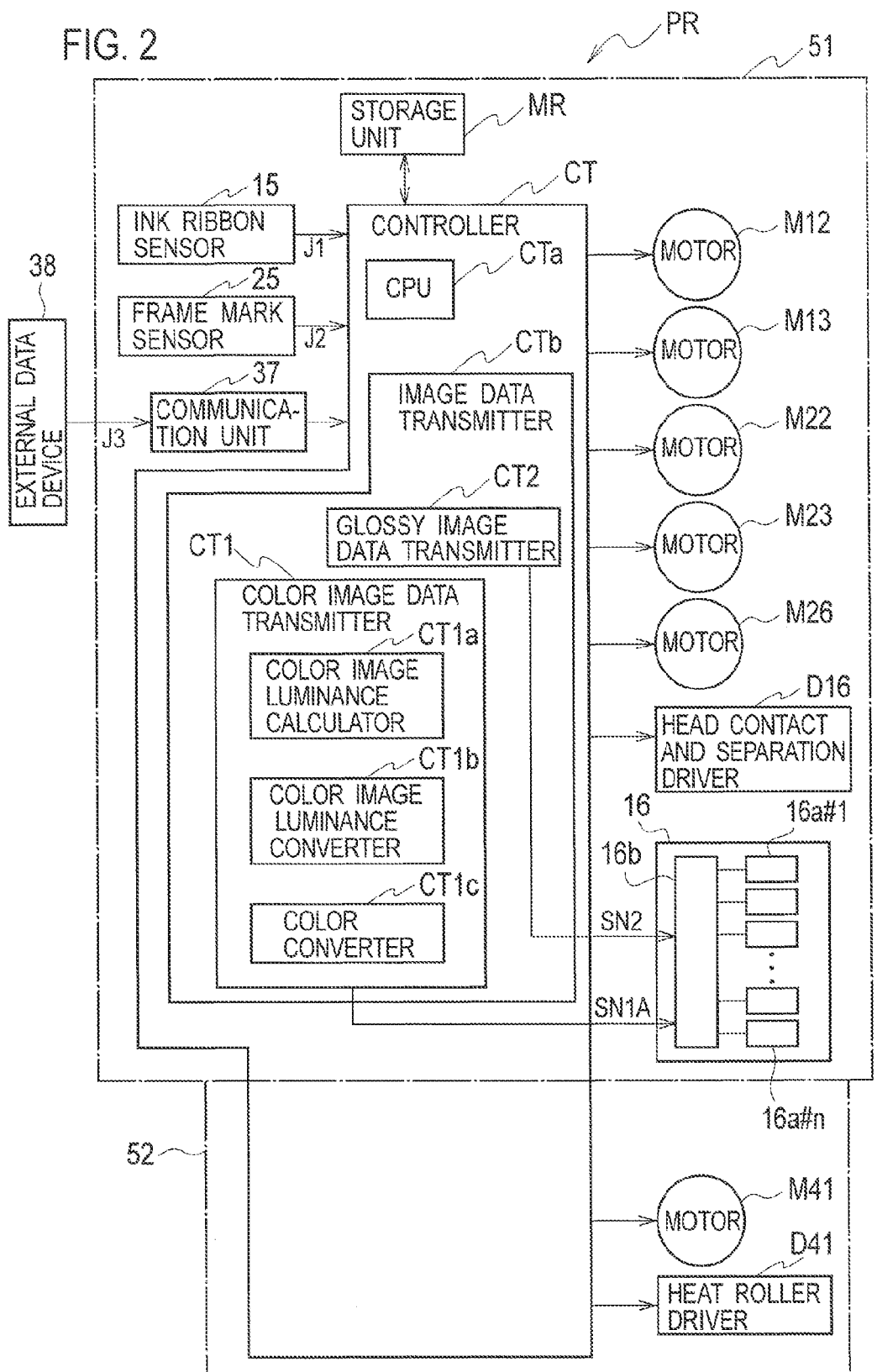
FIG. 2 is a block diagram illustrating the configuration of the printer PR.

As illustrated in FIGS. 1 and 2, the printer PR includes the controller CT, a storage unit MR, and a communication unit 37. The communication unit 37 functions as an input unit through which the printer PR receives externally transmitted data and the like. The controller CT includes a central processing unit (CPU) CTa and an image data transmitter CTb.

As illustrated in FIG. 2, the image data transmitter CTb includes a color image data transmitter CT1 and a glossy image data transmitter CT2. The color image data transmitter CT1 includes a color image luminance value calculator CT1*a*, a color image luminance value conversion unit CT1*b*, and a color conversion unit CT1*c*.

The controller CT is supplied with the transfer image information J3 (also refer to FIG. 31) through the communication unit 37 from the external data device 38. The supplied transfer image information J3 is stored in the storage unit MR, and is referred to by the controller CT when needed.

The storage unit MR previously stores an operation program for controlling the operation of the entire printer, the later-described luminance setting lower limit LUa and luminance setting upper limit LUb, and the luminance conversion processing selection information J3*a*.

In the case where the printer PR executes the later-described luminance conversion process B, a correction lower boundary value LUa1 and a correction upper boundary value LUb1 are also previously configured and stored in the storage unit MR.

Figure 31:
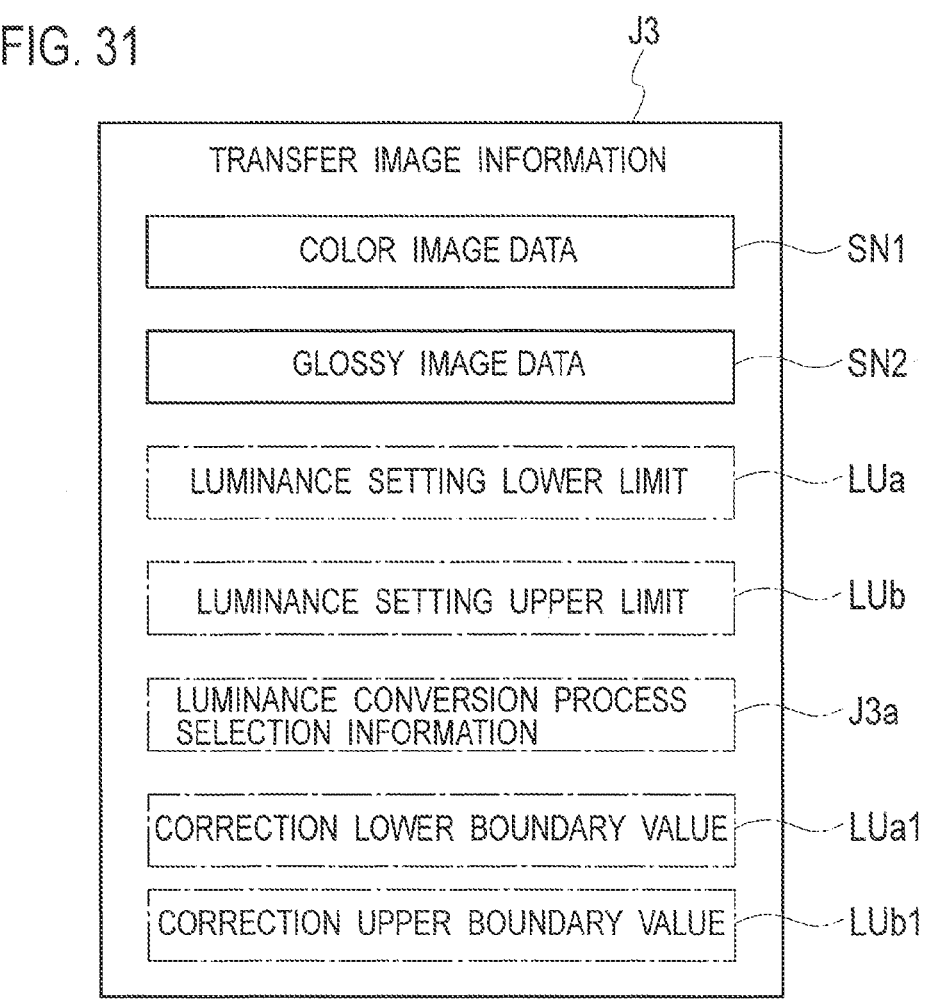
FIG. 31 is a diagram illustrating the transfer image information J3.

As illustrated in FIG. 31, the transfer image information J3 includes color image data SN1 as image data of a non-glossy color image transferred with color ink (hereinafter also referred to as a non-glossy color image) and glossy image data SN2 as a glossy image transferred with metal ink.

The luminance setting lower and upper limits LUa and LUb and the correction lower and upper boundary values LUa1 and LUb1, and luminance conversion process selection information J3*a*, are not limited to being stored in the storage unit MR in advance, may be included in the transfer image information J3, and externally supplied to be stored in the storage unit MR as indicated by a dashed dotted line in FIG. 31.

The color image data SN1 is composed of R, G, and B values (each composed of 8 bits, for example). The glossy image data SN2 is composed of a gloss value (hereinafter, also referred to an S value) of one bit.

The color image data transmitter CT1 executes luminance conversion for a conversion target area Ae (refer to FIG. 30) as a predetermined region of a non-glossy color image to be transferred, based on the color image data SN1. The conversion target region Ae is previously set to a whole or part of the non-glossy color image.

After the luminance conversion, the color image data transmitter CT1 creates image data SN1*y* of an image to be transferred with yellow ink, image data SN1*m* of an image to be transferred with magenta ink, and image data SN1*c* of an image to be transferred with cyan ink, and sends the created image data as the color image data SN1A to the thermal head 16 (refer to FIG. 6).

The method of luminance conversion executed by the color image data transmitter CT1 is described later.

The glossy image data transmitter CT2 acquires the glossy image data SN2 from the storage unit MR, and sends the same to the thermal head 16 (refer to FIGS. 2 and 6).

The image data transmitter CTb supplies to the thermal head 16 at proper timing, the color image data SN1A for color inks and the glossy image data SN2 for metal ink, which are to be transferred to a transfer frame F (refer to FIG. 4, described later in detail) of the intermediate transfer film 21, when the thermal head 16 is located at the pressure contact position.

The timing at which the color image data SN1A and the glossy image data SN2 are supplied is determined by the whole controller CT, based on the frame mark detection information J2 and the like.

Next, a description is given of the ink ribbon 11. As illustrated in (a) and (b) of FIG. 3, the ink ribbon 11 includes the belt-shaped ribbon base 11*a* and the ink layers 11*b*, which are applied and formed on the ribbon base 11*a*.

The ink ribbon 11 includes four types of ink layers as the ink layers 11*b*. The four types of ink layers are arranged in a predetermined order to constitute each ink group 11*b*1. The ink groups 11*b*1 are applied repeatedly in the longitudinal direction of the ink ribbon 11 (in the direction of arrow DRa).

To be specific, the ink group 11b1 includes the ink layer 11Y of yellow ink, the ink layer 11M of magenta ink, the ink layer 11C of cyan ink, and ink layer 11S of metal ink, which are applied in this order in the longitudinal direction.

The yellow ink, magenta ink, and cyan ink are sublimation inks, and transmit light. The metal ink is a gray fusion ink, for example. The metal ink contains metal particles, or flakes, and does not transmit light. The metal is aluminum or silver, for example.

The metal ink-transferred section formed on the transfer body by the transfer of the metal ink (substantially) specularly reflects the incident light with a high directivity. The metal ink-transferred part is visually recognized as a metallic, glossy silver color when seen in a specific viewing direction, which is the direction of reflection.

In each ink layer 11Y, the cue mark 11d is formed at the end of the boundary with the adjacent ink layer 11S of the metal ink.

The ink layers 11Y, 11M, 11C, and 11S have the same length La in the longitudinal direction. The pitch Lap of the group of the ink layers 11b is four times the length La.

The ink ribbon sensor 15 is positioned so that when the ink ribbon sensor 15 detects one of the cue marks 11d, the pressure contact position of the thermal head 16 corresponds to the position of the leading edge of the ink layer 11Y in the travel direction. That is, the travel path length from the pressure contact position to the position of detection by the ink ribbon sensor 15 is an integral multiple of the pitch Lap.

Next, a description is given of the intermediate transfer film 21 in detail. As illustrated in (a) and (b) of FIG. 4, the intermediate transfer film 21 includes a belt-shaped film base 21a, a release layer 21b, and a transfer image receiving layer 21c. The release layer 21b and the transfer image receiving layer 21c are laid on the film base 21a.

The film base 21a has the same width as the ribbon base 11a of the ink ribbon 11. In the film base 21a or the transfer image receiving layer 21c, the frame marks 21d are repeatedly formed with a predetermined pitch Lb in the longitudinal direction (in the direction of arrow DRb).

Each frame mark 21d is formed across the entire width. The pitch Lb is equal to the length La in the ink ribbon 11 (Lb=La).

The transfer frames F are regions partitioned at regular intervals of the pitch Lb in the intermediate transfer film 21. Hereinafter, the transfer frames F are referred to as frames F. The frame marks 21d are provided at boundaries of the frames F to partition the frames F, so that the plural frames F are arranged side by side in the longitudinal direction of the intermediate transfer film 21.

The frame mark sensor 25 (refer to FIG. 1) is positioned so that when the frame mark sensor 25 detects one of the frame marks 21d, the pressure contact position of the thermal head 16 corresponds to the position of the leading edge of the frame mark 21d in the travel direction. That is, the travel path length from the pressure contact position to the position of detection by the frame mark sensor 25 is an integral multiple of the pitch Lb. The travel path length is four times the pitch Lb, for example.

In the transfer device 51, the intermediate transfer film 21 and the ink ribbon 11 are laid so that the transfer image receiving layer 21c directly faces the ink layer 11b, as illustrated in FIG. 5.

The transfer image receiving layer 21c receives and fixes the inks of the ink layers 11Y, 11M, and 11C, which are heated and sublimated, and receives and fixes the metal ink of the ink layer 11S which is heated and fused.

When the thermal head 16 is in pressure contact with the ink ribbon 11 as illustrated in FIG. 5, the ink of the ink layer 11b, which is pressed against the transfer image receiving layer 21c, is transferred to form and print an image in the transfer image receiving layer 21.

In the transfer process, the color inks of the ink layers 11Y, 11M, and 11C are transferred according to a heating pattern corresponding to the color image data SN1A supplied to the thermal head 16. The metal ink of the ink layer 11S is transferred according to a heating pattern corresponding to the glossy image data SN2 supplied to the thermal head 16.

The transfer device 51, described above in detail, is configured so that the ink ribbon 11 and the intermediate transfer film 21 loaded by the user can move in a longitudinal direction, while being brought into contact with each other by the thermal head 16.

As illustrated in FIG. 6, the thermal head 16 includes n (n is an integer equal to or greater than 2) heating resistors 16a (#1 to #n), arrayed in the width direction of the ink ribbon 11. The thermal head 16 includes the head driver 16b, which energizes the plural heating resistors 16a independently, in accordance with the color image data SN1 and the glossy image data SN2. The heating resistors 16a include 300 heating resistors, arrayed side by side per 1 inch, for example.

The head driver 16b energizes each of the plural heating resistors 16a, based on the color image data SN1A used for transfer of the color ink and the glossy image data SN2, used for transfer of the metal ink which are transmitted from the image data transmitter CTb.

An image to be formed does not use every n of the heating resistors 16a, and typically uses m of the heating resistors 16a (m is an integer not less than 1, and m<n). The m heating resistors 16a are adjacent to each other, and margins must be left at both ends in the direction in which the resistors 16a are arranged.

That is, (n−m) of the plural heating resistors 16a, arranged side by side, are left as the margins and are not used in image formation. The m heating resistors 16a are successive ones, selected from the n heating resistors 16a, other than at least the heating resistor 16a located at the end.

An image is formed with m×LNa (width×length) dots on the intermediate transfer film 21 as an image-formed body. Herein, LNa indicates the number of lines of the image to be transferred in the longitudinal direction. The number LNa corresponds to the number of lines that can be energized independently.

When the printer PR forms an image of 300 dpi on a card with the external dimensions of 86 mm×54 mm as a transfer body for retransfer, m is about 1000, and LNa is about 600.

The transfer device 51 moves the ink ribbon 11 and the intermediate transfer film 21, which are in close contact with each other, while properly energizing each heating resistor 16a of the thermal head 16 based on the color image data SN1A at the transfer of the color inks, and based on the glossy image data SN2 at the transfer of the metal ink. The transfer device 51 thus transfers and superimposes the inks of the ink layers 11b of the ink ribbon 11 in the same frame F of the transfer image receiving layer 21c of the intermediate transfer film 21.

Accordingly, the desired glossy color image is transferred to the frame F of the transfer image receiving layer 21c. The details of this image-forming operation are described later.

Returning to FIG. 1, the printer PR includes the retransfer device 52. The retransfer device 52 retransfers a part of the image (hereinafter, also referred to as the intermediate image P) formed in the transfer image receiving layer 21c of the intermediate transfer film 21, as the transfer body in the transfer device 51, to one of the card materials 31a as another transfer body to produce each card 31. In FIG. 1, the card materials 31a and card 31, which are being conveyed, are illustrated by thick lines. Herein, the card 31 is composed of the card material 31a with an image formed by retransfer.

The retransfer device 52 shares the controller CT with the transfer device 51. The retransfer device 52 includes a retransfer unit ST1, a supply unit ST2, and a delivery unit ST3. The retransfer unit ST1 is provided between the platen roller 26 and the take-up reel 23 on the travel path of the intermediate transfer film 21. The supply unit ST2 supplies the card materials 31a to the retransfer unit ST1. The delivery unit ST3 delivers the cards 31, having passed through the retransfer unit ST1.

The retransfer unit ST1 includes a heat roller 41 rotated by the motor M41, an opposite roller 42 provided opposite to the heat roller 41, and a heat roller driver D41. The heat roller driver D41 brings the heat roller 41 close to or away from the opposite roller 42.

The supply unit ST2 includes a reorientation unit ST2a, which sandwiches each card material 31a and rotates by 90 degrees, so that the card material 31a is reoriented from the vertical position to the horizontal position.

The supply unit ST2 includes a pick-up roller 33. The pick-up roller 33 rotates so as to raise the rightmost (FIG. 1) of the plural card materials 31a, which are standing vertically in the stacker 32.

The supply unit ST2 includes a pair of feeding rollers 34, and plural pairs of conveyance rollers 35. The feeding rollers 34 sandwich and feed each card material 31a, raised by the pick-up roller 33 to the reorientation unit ST2a, provided above the supply unit ST2. The conveyance rollers 35 feed the cards 31, reoriented to the horizontal position by the reorientation unit ST2a to the retransfer unit ST1 in the left side.

The operation of the motor M41 is controlled by the controller CT. The pick-up roller 33, the feeding rollers 34, and conveyance rollers 35 are driven and rotated by the unillustrated motors under control of the controller CT.

The retransfer device 52 reorients each card material 31a which is standing vertically, and is picked up from the stacker 32 in the supply unit ST2 to the horizontal position in the reorientation unit ST2a. The retransfer device 52 then conveys and supplies the reoriented card material 31a to the retransfer unit ST1.

In the retransfer unit ST1, the card material 31a is pressed and sandwiched between the heated heat roller 41 and the opposite roller 42, together with the intermediate transfer film 21 by the operation of the heat roller driver D41, while being driven to move toward the conveyance unit ST3 by the motor M41. The card material 31a is brought into pressure contact with the transfer image receiving layer 21c of the intermediate transfer film 21.

Through the aforementioned movement of the card material 31a in pressure contact, a partial range of the intermediate image P formed in the transfer image receiving layer 21c by the transfer device 51 is transferred onto the card material 31a to form an image Pc. In other words, the image Pc as a formed image is formed by retransfer on the surface of the card material 31a, thus producing the card 31. The card 31, which is obtained by forming the image Pc on the card material 31a by retransfer, is conveyed to the conveyance unit ST3, and is stacked and accommodated in an external stocker 36, for example.

The timing at which retransfer is executed is not limited. Retransfer may be executed after the intermediate image P is formed in one of the frames F, before the intermediate image P is formed in the next frame F. Alternatively, retransfer may be executed after the intermediate image P is formed in the plural frames F.

Next, a description is given of the luminance conversion process performed for the color image data SN1 of the non-glossy color image by the color image data transmitter CT1.

In the color image data SN1 externally supplied, the data structure of each pixel constituting an image is composed of 8 bits (256 shades) for each color of red, green, and blue, as illustrated in FIG. 7, for example.

As illustrated in FIG. 8, for execution of the luminance conversion process, the color image luminance value conversion unit CT1b acquires the transfer image information J3 stored in the storage unit MR (Step 1).

Based on the luminance conversion process selection information J3a included in the transfer image information J3, the color image data transmitter CT1 determines which one of three luminance conversion processes (luminance conversion processes A to C) to execute as the luminance conversion process (Step 2).

The color image luminance value conversion unit CT1b is capable of executing all of the luminance conversion processes A to C, and selects and executes any one of the luminance conversion processes A to C based on the luminance conversion process selection information J3a, included in the transfer image information J3 (Steps 3 to 5 in FIG. 8).

The luminance conversion process A is a process to apply a lower or upper limit to the luminance value LU of a pixel which is a target for luminance conversion, when the luminance value LU is less than the luminance setting lower limit LUa or greater than the luminance setting upper limit LUb.

The luminance conversion process B is a process to apply tone compression to the luminance value LU of a pixel, which is a target for luminance conversion when the luminance value LU is less than the correction lower boundary value LUa1 or greater than the correction lower boundary value LUb1.

The luminance conversion process C is a process to linearly compress the luminance value possible range of pixels as a target for conversion to a predetermined luminance value range.

Hereinafter, the luminance conversion processes A, B, and C are described.

Figure 30:
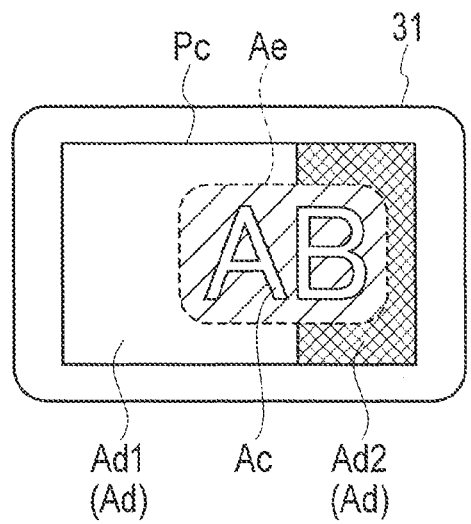
FIG. 30 is a diagram illustrating the conversion target area Ae.

Pixels, as the target for the luminance conversion processes A, B, and C, are included in the conversion target region Ae set to whole or a part of the non-glossy color image. The conversion target region Ae is set as a region to which the metal ink is to be transferred to form a gloss region. The conversion target region Ae, set to a part of the non-glossy color image, is illustrated in FIG. 30 by way of example.

(Luminance Conversion Process A) (Refer to FIGS. 9 and 10)

In the color image data SN1, N pixels Qa correspond to the conversion target region Ae as the execution target of luminance conversion.

First, the color image luminance value calculator CT1a sets m to 1 (Step A1) and calculates the luminance value LU of the m-th (the first) pixel Qa.

To be specific, the color image luminance value calculator CT1a calculates the luminance value LU by Equation (1) based on the maximum value (maxRGB) and the minimum value (minRGB) among the R, G, and B values of the m-th pixel. The luminance value LU is a numeral satisfying 0<=LU<=255.

$$LU=[(maxRGB)+(minRGB)]/2 \quad (1)$$

The color image luminance value conversion unit CT1*b* determines whether the luminance value LU is 0 (Step A3). When the luminance value LU is not 0, the color image luminance value conversion unit CT1*b* determines whether the luminance value LU is less than the luminance setting lower limit LUa (0<LU<LUa) (Step A4).

When the luminance value LU is determined to be less than the luminance setting lower limit LUa, the color image luminance value conversion unit CT1*b* calculates a correction gain value GHa by Equation (2) (Step A5) (refer to FIG. 10).

$$GHa=LUa/LU \quad (2)$$

The color image luminance value conversion unit CT1*b* multiplies the R, G, and B values of the pixel Qa by the correction gain value GHa obtained by Equation (2), to create post-conversion R, G, and B values of the pixel Qa (Step A6). The luminance value of the pixel Qa is thereby raised, and is set as the luminance setting lower limit LUa.

When the luminance value LU is determined to be 0 in Step A3, the color image luminance value conversion unit CT1*b* sets each of the R, G, and B values to the luminance setting lower limit LUa (Step A7) without using Equation (2). The luminance value LU is therefore equal to the luminance setting lower limit LUa.

When the luminance value LU of the pixel Qa is determined to be not less than the luminance setting lower limit LUa (Step A4), the color image luminance value conversion unit CT1*b* determines whether the luminance value LU of the pixel Qa is greater than the luminance setting upper limit LUb (LUb<LU) (Step A8).

That is, Step A8 is a step of determining whether the luminance value LU is within a setting maintained range ARs (LUa<=LU<=LUb) which is equal to or greater than the luminance setting lower limit LUa, and equal to or not less than the luminance setting upper limit LUb.

When the luminance value LU is determined to be greater than the luminance setting upper limit LUb, the color image luminance value conversion unit CT1*b* calculates the correction gain value GHb by Equation (3) (Step A9) (refer to FIG. 10).

$$GHb=LUb/LU \quad (3)$$

The color image luminance value conversion unit CT1*b* multiplies each of the R, G, and B values of the pixel Qa by the correction gain value GHb obtained by Equation (3), to create the converted R, G, and B values of the pixel Qa (Step A10). The luminance value LU of the pixel Qa is thereby reduced to the luminance setting upper limit LUb.

When the luminance value LU of the pixel Qa is determined to be not greater than the luminance setting upper limit LUb in Step A8, the color image luminance value conversion unit CT1*b* maintains the R, G, and B values.

The color image luminance value conversion unit CT1*b* determines whether m has reached N (Step A11) after Steps A6, A7, and A10, and negative determination in Step A8. That is, the color image luminance value conversion unit CT1*b* determines whether the luminance conversion process has been performed for all the pixels Qa as the target for luminance conversion.

When m has not reached N, m is incremented by 1 (Step A12), and the procedure continues to Step A2. The luminance conversion process is executed for the next pixel. When m has reached N, the process is terminated.

The processing method of the luminance conversion process A is described using a concrete example. Herein, the luminance setting lower and upper values LUa and LUb are set as: LUa=50, and LUb=150.

The R, and G, and B values of the pixel Qa are 10, 20, and 30, respectively, as illustrated in (a) of FIG. 11, and the luminance value LU of the pixel Qa is calculated by Equation (1) as Equation (4).

$$LU=(30+10)/2=20 \quad (4)$$

Since the luminance value LU is less than the luminance setting lower limit LUa, the correction gain value GHa is calculated as Equation (5).

$$GHa=50/20=2.5 \quad (5)$$

Accordingly, Step A6 is executed to covert the pre-conversion R, G, and B values (10, 20, and 30) of the pixel Qa to the post-conversion R, G, and B values as, illustrated in (a) of FIG. 11.

$$R=10\times2.5=25$$

$$G=20\times2.5=50$$

$$B=30\times2.5=75$$

The post-conversion luminance value LU is therefore 50 as the luminance setting lower limit LUa.

When the R, G, and B values of the pixel Qa are 200, 220, and 240, respectively, as illustrated in (b) of FIG. 11, the luminance value LU of the pixel Qa is calculated by Equation (1) as Equation (6).

$$LU=(240+200)/2=220 \quad (6)$$

The luminance value LU is greater than the luminance setting upper limit LUb, and the correction gain value GHb is calculated as Equation (7).

$$GHb=150/220\approx0.68 \quad (7)$$

Accordingly, Step A10 is executed to covert the pre-conversion R, G, and B values (200, 220, and 240) of the pixel Qa to the post-conversion R, G, and B values, as illustrated in (b) of FIG. 11.

$$R=200\times0.68\approx136$$

$$G=220\times0.68\approx150$$

$$B=240\times0.68\approx163$$

The post-conversion luminance value LU is therefore 150 as the luminance setting upper limit LUb.

The color image luminance value conversion unit CT1*b* converts the R, G, and B values of every pixel in the conversion target region Ae to the post-conversion R, G, and B values, as shown in the above examples.

According to the luminance conversion process A, for a pixel having a luminance value LU of less than the luminance setting lower limit LUa, the post-conversion luminance value LU is set equal to the luminance setting lower limit LUa. For a pixel having a luminance value LU of greater than the luminance setting upper limit LUb, the post-conversion luminance value LU is set equal to the luminance setting upper limit LUb. That is, the luminance conversion process is performed so that the pixels of the luminance value LU of which is not included in the setting maintained range ARs have the same luminance.

The luminance conversion process A is therefore suitable for processing of animated images, for example, in which the density of a glossy color image includes a discrete change because the difference in luminance between the before and after luminance conversion is indistinguishable. (Luminance Conversion Process B) (Refer to FIGS. 12 and 13)

The luminance conversion process B uses the correction lower and upper boundary values LUa1 and LUb1 within the setting maintained range ARs, in addition to the luminance setting lower and upper limits LUa and LUb. The correction upper boundary value LUb1 is greater than the correction lower boundary value LUa1. Then, $$LUa<LUa1<LUb1<LUb$$

In the case of executing the luminance conversion process B, the correction lower and upper boundary values LUa1 and LUb1 are previously configured and included in the transfer image information J3.

First, it is assumed that N pixels Qb correspond to the conversion target region Ae, which is an execution target of luminance conversion, in the color image data SN1.

First, the color image luminance value calculator CT1$a$ is set m to 1 (Step B1) and calculates the luminance value LU of the m-th (first) pixel Qb (Step B2). The method of calculating the luminance value LU is the same as that of the luminance conversion process A, and uses Equation (1).

The color image luminance value converter CT1$b$ determines whether the luminance value LU of the pixel Qb is equal to or greater than 0 and less than the correction lower boundary value LUa1 (Step B3). When the luminance value LU of the pixel Qb is determined to be equal to or greater than 0 and less than the correction lower boundary value LUa1, the color image luminance value converter CT1$b$ calculates a correction value Ha from a function fa of the luminance value LU and correction value H, which is represented by the line segment LN1 in FIG. 13 (Step B4).

The function fa is a linear function in this example, and it is defined by Equation (8).

$$Ha=-(LUa/LUa1)\times LU+LUa \qquad (8)$$

The correction value Ha obtained by the function fa is a value added to increase the luminance value LU to the luminance setting lower limit LUa or greater when the luminance value LU is less than the correction lower boundary value LUa1. The correction value Ha is decided depending on the luminance value LU.

The color image luminance value converter CT1$b$ substitutes the luminance value LU of the pixel Qb in Equation (8) to obtain the correction value Ha. The color image luminance value converter CT1$b$ adds the correction value Ha to the R, G, and B values of the pixel Qb to create the post-conversion R, G, and B values as the post-conversion R, G, and B values of the pixel Qb (Step B5). The luminance value of the pixel Qb is converted to the luminance setting lower limit LUa or greater, so that the luminance is increased.

When the luminance value LU of the pixel Qb is determined to be less than 0 or not less than the correction lower boundary value LUa1 in Step B3, the color image luminance value converter CT1$b$ determines whether the luminance value LU of the pixel Qb is greater than LUb1 (Step B6). When the luminance value LU of the pixel Qb is not greater than LUb1, the color image luminance value converter CT1$b$ calculates the correction value Hb based on the function fb of the luminance value LU and correction value H, which is represented by the line segment LN2 in FIG. 13 (Step B7).

The function fb is a linear function, for example, and is defined by Equation (9).

$$Hb=-[(255-LUb)/(255-LUb1)]\times LU+[(255-LUb)/(255-LUb1)]\times LUb1 \qquad (9)$$

The correction value Hb obtained by the function fb is a value (a negative value) added to reduce the luminance value LU to the luminance setting upper limit LUb or less when the luminance value LU is greater than the correction upper boundary value LUb1. The correction value Hb is decided depending on the luminance value LU.

The color image luminance value converter CT1$b$ substitutes the luminance value LU of the pixel Qb in Equation (9) to obtain the correction value Hb. The color image luminance value converter CT1$b$ adds the correction value Hb to the R, G, and B values of the pixel Qb, to create the post-conversion R, G, and B values as the post-conversion R, G, and B values of the pixel Qb (Step B8). The luminance value of the pixel Qb is thereby converted to the luminance setting upper limit LUb or less so that the luminance is reduced.

When the luminance value LU of the pixel Qb is determined to be not greater than LUb1 (Step B6), that is, when the luminance value LU of the pixel Qb is equal to or greater than the correction lower boundary value LUa1, and equal to or less than the correction upper boundary value LUb1 (LUa1<=LU<=LUb1), the color image luminance value converter CT1$b$ maintains the R, G, and B values.

The color image luminance value unit CT1$b$ determines whether m has reached N after Steps B5, B8, and negative determination in Step B6 (Step B9). That is, the color image luminance value converter CT1$b$ determines whether the luminance conversion process has been executed for all the pixels Qb which are targeted for luminance conversion.

When m has not reached N (Step B9), the color image luminance converter CT1$b$ increments m by 1 (Step B10) and proceeds to Step B2 to execute the luminance conversion process for the next pixel. When m has reached N (Step B9), the color image luminance converter CT1$b$ terminates the process.

The processing method of the luminance conversion process B is described using a concrete example. Herein, the luminance setting lower and upper values LUa and LUb are set as: LUa=50, and LUb=150. The correction lower and upper boundary values LUa1 and LUb1 are set as: LUa1=105, and LUb1=135.

When the R, G, and B values of the pixel Qb are 50, 130, and 80, respectively, as illustrated in (a) of FIG. 14, the luminance value LU of the pixel Qb is calculated by Equation (1) as Equation (10).

$$LU=(130+50)/2=90 \qquad (10)$$

The luminance value LU is greater than the luminance setting lower limit LUa, but less than the correction lower boundary value LUa1. The color image luminance value converter CT1$b$ therefore calculates the correction value Ha by the function fa. The correction value Ha is calculated as Equation (11).

$$Ha=-(50/105)\times 90+50\approx 7 \qquad (11)$$

Accordingly, the R, G, and B values (50, 130, and 80) of the pixel Qb are converted to the post-conversion R, G, and B values, as illustrated in (a) of FIG. 14.

$$R=50+7=57$$

$$G=130+7=137$$

$$B=80+7=87$$

The luminance value LU after conversion is 97 by Equation (1).

When the R, G, and B values of the pixel Qb are 200, 220, and 240, respectively, as illustrated in (b) of FIG. 14, the luminance value LU of the pixel Qb is calculated by Equation (1) as Equation (12).

$$LU=(240+200)/2=220 \quad (12)$$

The luminance value LU is greater than the luminance setting upper limit LUb, and the color image luminance value converter CT1b calculates the correction value Hb by the function fb. The color image luminance value converter CT1b calculates the correction value Hb as Equation (13).

$$Hb=-[(255-150)/(255-135)]\times 220+[(255-150)/(255-135)]\times 135=-74.3 \quad (13)$$

Accordingly, the R, G, and B values (200, 220, and 240) of the pixel Qb are converted to the converted R, G, and B values as illustrated in (b) of FIG. 14.

$$R=200-74.3\approx 126$$

$$G=220-74.3\approx 146$$

$$B=240-74.3\approx 166$$

The luminance value LU after conversion is therefore 146.

As illustrated in the aforementioned examples, the color image luminance value converter CT1b uses the function fa or fb to calculate the luminance value LU for every pixel in the conversion target region Ae of the color image data SN1, and convert the R, G, an B values of the pixel as the target for conversion to obtain the post-conversion R, G, and B values.

With the luminance conversion process B, for pixels of which the luminance value LU is less than the correction lower boundary value LUa1, the color image luminance value converter CT1b converts the luminance value LU to a value which corresponds to the luminance value LU and is equal to or greater than the luminance setting lower limit LUa.

For pixels of which the luminance value LU is greater than the correction upper boundary value LUb1, the color image luminance value converter CT1b converts the luminance value LU to a value which corresponds to the luminance value LU and is equal to or less than the luminance setting upper limit LUb.

That is, the luminance values Lu of pixels of which are not included in the setting maintained range ARs are converted to values smoothly varying between the luminance setting lower and upper limits LUa and LUb, depending on the pre-conversion luminance values LU.

The luminance conversion process B is suitable for the processing of photograph images and the like, for example, in which the non-glossy color image finely changes in density because the difference in luminance between before and after the luminance conversion is less distinguishable.

(Luminance Conversion Process C)

In the luminance conversion process C, the color image luminance value calculator CT1a calculates the luminance value LU of the pixels Qc corresponding to the conversion target region Ae, targeted for luminance conversion based on Equation (1).

Next, the color image luminance value converter CT1b converts the obtained luminance value LU, based on Equation (14). The luminance value after conversion is referred to as a post-conversion luminance value LUα.

$$LU\alpha=(LUb-LUa)\times LU/255+LUa \quad (14)$$

Using the maxRGB and minRGB used in Equation (1), post-conversion maxRGBα and minRGBα, which give the post-conversion luminance value LUα, are obtained based on Equations (15) and (16) as Equations (17) and (18).

$$LU\alpha=[(\max RGB\alpha)+(\min RGB\alpha)]/2 \quad (15)$$

$$(\max RGB\alpha)/(\min RGB\alpha)=(\max RGB)/(\min RGB) \quad (16)$$

$$(\max RGB\alpha)=2\times LU\alpha\times(\max RGB)/((\max RGB)+(\min RGB)) \quad (17)$$

$$(\min RGB\alpha)=2\times LU\alpha\times(\min RGB)/[(\max RGB)+(\min RGB)] \quad (18)$$

The remaining one (midRGB) of the R, G, and B values that is not used in the calculation of luminance is converted to midRGBα by Equation (19).

$$(\mathrm{mid}RGB\alpha)=2\times LU\alpha\times(\mathrm{mid}RGB)/[(\max RGB)+(\min RGB)] \quad (19)$$

The color image luminance value converter CT1b replaces maxRGB, minRGB, and midRGB of the R, G, and B values of each pixel Qc with maxRGBα, minRGBα, and midRGBα as the post-conversion R, G, and B values of the pixel Qc.

The processing method of the luminance conversion process C is described using a concrete example. Herein, the luminance setting lower and upper values LUa and LUb are set as: LUa=50, and LUb=150. The luminance value LU can be a numeral value satisfying 0<=LU<=255. The R, G, and B values of the pixel Qc are 10, 20, and 30, respectively, as illustrated in (a) of FIG. 11.

In this case, the luminance value Lu of the pixel Qc is 20 by Equation (4). Herein, maxRGB=30, minRGB=10, and midRGB=20.

The luminance value LU is converted to the luminance value LUα by Equation (14) as Equation (20).

$$LU\alpha=(150-50)\times 20/255+50\approx 57.8 \quad (20)$$

The post-conversion maxRGBα, minRGBα, and midRGBα are calculated from Equations (17), (18), and (19), respectively.

$$\max RGB\alpha=2\times 57.8\times 30/(30+10)\approx 86.7$$

$$\min RGB\alpha=2\times 57.8\times 10/(30+10)\approx 28.9$$

$$\mathrm{mid}RGB\alpha=2\times 57.8\times 20/(30+10)\approx 57.8$$

Based on the above results, the color image luminance value converter CT1b converts the R, G, and B values to 28.9, 57.8, and 86.7, respectively.

The luminance conversion process C converts the luminance value possible range (0 to 255, for example) of pixels targeted for conversion to a predetermined luminance value range, which is included in the luminance value possible range and is narrower than the same, that is, the range equal to or greater than the luminance setting lower limit LUa, and equal to or less than the luminance setting upper limit LUb. The conversion method is not limited and can be linear compression, for example.

The luminance value possible range of pixels targeted for conversion may be set to a range equal to or greater than the minimum luminance value of pixels, and equal to or less than the maximum luminance value of pixels included in the color image data SN1. When the minimum and maximum luminance values of pixels included in the color image data SN1 are respectively 10 and 250, for example, the luminance value possible range of pixels targeted for conversion is 10 to 250. Luminance values from 10 to 250 are converted through linear compression into a range of equal to or greater than the luminance setting lower limit LUa (50, for example) and equal to or less than the luminance setting upper limit LUb (150, for example).

The luminance conversion process C is described more specifically. It is assumed that five pixels are targeted for conversion for the sake of simplicity. The luminance values of the five pixels are at intervals of 50, such as 20, 70, 120, 170, and 220. The luminance setting lower and upper limits LUa and LUb are previously set to 70 and 170, respectively.

The color image luminance value converter CT1$b$ compares the minimum luminance value with the luminance setting lower limit LUa. When the minimum luminance value is less than the luminance setting lower limit LUa, the color image luminance value converter CT1$b$ converts the minimum luminance value to the luminance setting lower limit LUa.

Herein, the minimum luminance value (=20) is less than the luminance setting lower limit LUa (=70). The color image luminance value converter CT1$b$ converts the minimum luminance value to the luminance setting lower limit LUa (=70). The color image luminance value converter CT1$b$ compares the maximum luminance value with the luminance setting upper limit LUb. When the maximum luminance value is greater than the luminance setting upper limit LUa, the color image luminance value converter CT1$b$ converts the maximum luminance value to the luminance setting upper limit LUb. In this example, the maximum luminance value (=220) is larger than the luminance setting upper limit LUb (=170). The color image luminance value converter CT1$b$ converts the maximum luminance value to the luminance setting upper limit LUb (=170).

The luminance value range from 20 to 220 between the pre-conversion minimum and maximum luminance values, including the other three luminance values of 70, 120, and 170, is linearly compressed to a luminance value range from 70 to 170, for example.

The three luminance values 70, 120, and 170 are converted to 95, 120, and 145 by linear compression, respectively.

The color image luminance value converter CT1$b$ may be configured to, when one of the minimum and maximum luminance values of the pixels included in the color image data SN1 is out of the range of equal to or greater than the luminance setting lower limit LUa, and equal to or less than the luminance setting upper limit LUb, convert the one to a value within the same range as above.

When the minimum luminance value is 20, which is less than the luminance setting lower limit LUa (=70) and the maximum luminance value is 130, which is less than the luminance setting lower limit LUb (=150), the color image luminance value converter CT1$b$ converts the minimum luminance value to the luminance setting lower limit LUa or greater.

In this case, the color image luminance value converter CT1$b$ may maintain the maximum luminance value or may convert the maximum luminance value in a range of equal to or less than the luminance setting upper limit LUb.

When the minimum luminance value is 80, which is greater than the luminance setting lower limit LUa (=70), and the maximum luminance value is 190, which is greater than the luminance setting lower limit LUb (=150), for example, the color image luminance value converter CT1$b$ converts the maximum luminance value to the luminance setting lower limit LUa or less.

In this case, the color image luminance value converter CT1$b$ may maintain the minimum value or may convert the minimum luminance value in a range of equal to or greater than the luminance setting lower limit LUa.

In the luminance conversion process C, the color image luminance value converter CT1$b$ converts the possible luminance value range of pixels targeted for luminance conversion to a range of equal to or greater than the luminance setting lower limit LUa, and equal to or less than luminance setting upper limit LUb, based on the minimum or maximum luminance value.

The luminance conversion process C is suitable for processing in the case where the non-glossy color images have density values scattered in a range from 0 to 255 (or from 10 to 250, for example) and the relative difference in density between the pixels is important. For example, the luminance conversion process C is suitable for processing in the case where the non-glossy color image is a gray-scale image, having density values scattered in a range from 0 to 255 (or from 10 to 250, for example).

The color converter CT1$c$ performs color conversion for the R, G, and B values of each pixel into Y, M, and C values. To be specific, the color converter CT1$c$ performs color conversion for the post-conversion R, G, and B values of each pixel, obtained through the luminance conversion by the color image luminance value converter CT1$b$ into the Y, M, and C values.

The color converter CT1$c$ creates image data SN1$y$, SN1$m$, and SN1$c$ based on the post-conversion R, G, and B values obtained through the luminance conversion by the color image luminance value converter CT1$b$, and sends the created image data SN1$y$, SN1$m$, and SN1$c$ to the thermal head 16 as the color image data SN1A.

Next, luminance conversion by the color image converter CT1$b$ is described with reference to a color table.

FIG. 15 illustrates an RGB cube, and (a) and (b) of FIG. 16 are exploded diagrams of two three-face color tables that constitute the six faces of the RGB cube of FIG. 15. (c) of FIG. 16 illustrates a gray-scale chart. R, G, and B have 256 shades from 0 to 255. FIG. 15 also illustrates the R, G, and B components of R, G, B, Y, M, C, BK, and W (white).

By the luminance conversion processes A and B described above, the possible color region of the post-conversion R, G, and B values includes a hatched region ARa in (a) of FIG. 16, and a hatched region ARb in FIG. 16B. The possible region of the post-conversion R, G, and B values on a gray-scale chart is a central hatched region ARc.

Using the luminance value LU of a pixel calculated from Equation (1), the region ARa is a region defined by LUa<=LU, and the region ARb is a region defined by LU<=LUb. The region ARc is a region defined by LUa<=R=G=B<=LUb.

In other words, the luminance conversion processes A and B are processes to compress and convert the entire regions of the two exploded three-face color tables and the entire region of the gray scale chart into the regions ARa, ARb, and Arc, respectively.

Next, with reference to FIGS. 17 to 23, a description is given of the specific operation and method to form an image on the intermediate transfer film 21, which are executed by the transfer device 51 using the color image data SN1A and the glossy image data SN2.

The transfer device 51 performs a rewinding operation and a cueing operation in each operation to transfer the three types of color ink and the metal ink.

The operation procedure described below is a procedure to transfer the intermediate image P to the frame F1 of the intermediate transfer film 21.

Figure 17:
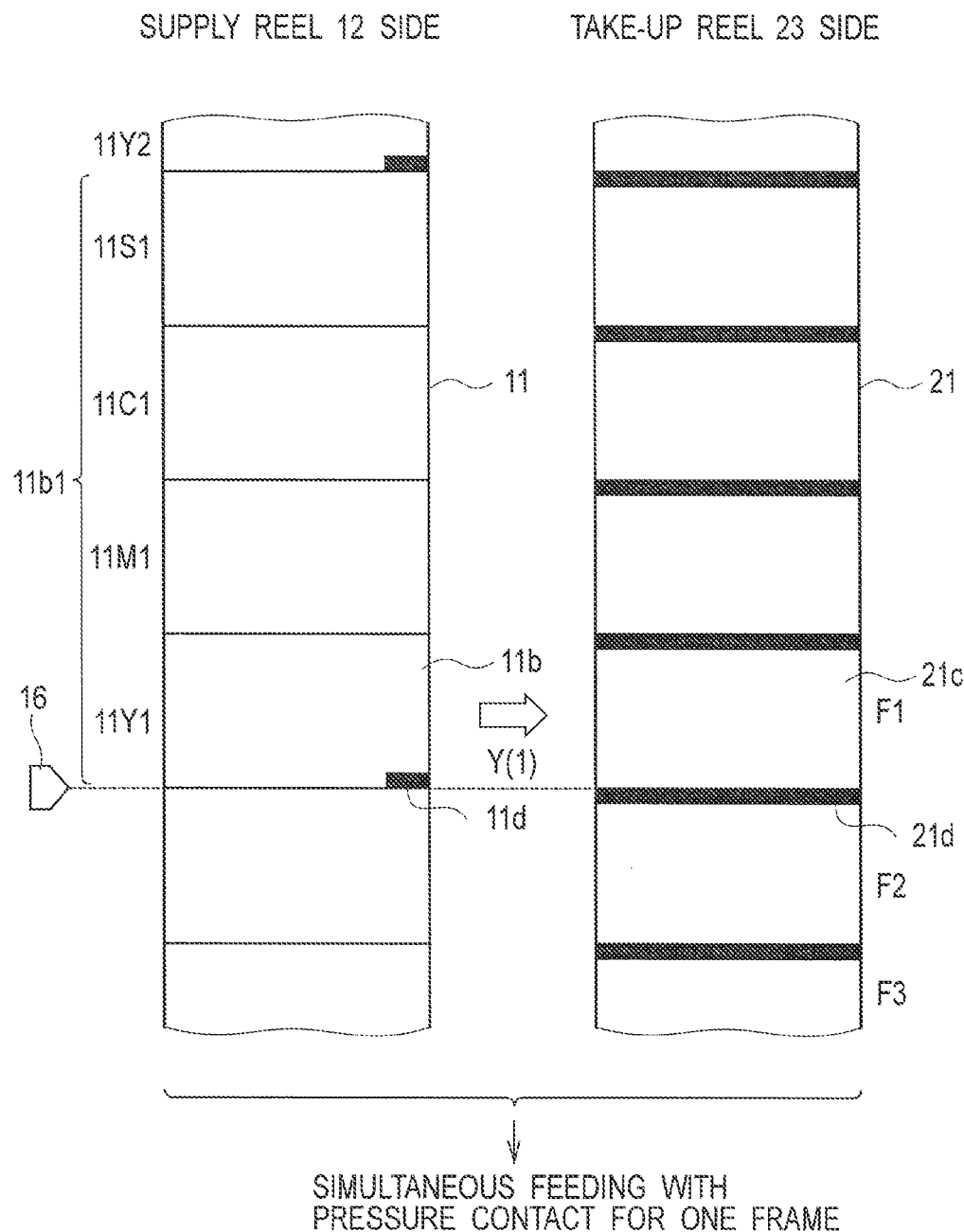
FIG. 17 is a first diagram illustrating an operation to transfer and form the intermediate image P on the intermediate transfer film 21.
Figure 18:
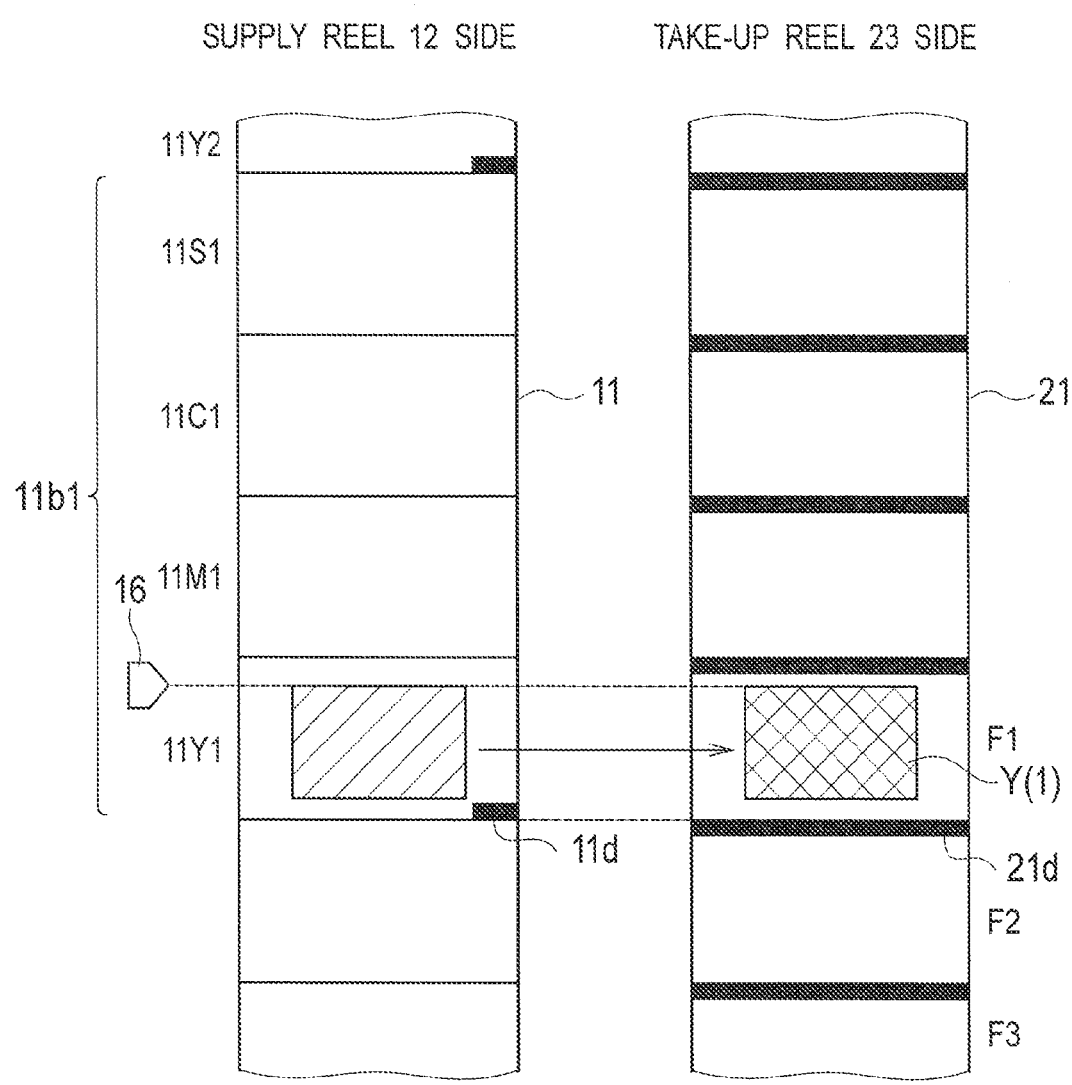
FIG. 18 is a second diagram illustrating the operation to transfer and form the intermediate image P on the intermediate transfer film 21.

FIGS. 17 and 18 illustrate the thermal head 16, which is not movable in the conveyance direction (the longitudinal direction) of the ink ribbon 11, the positions of the ink ribbon 11 and intermediate transfer film 21 relative to the position of the thermal head 16, and the transferred contents.

The surface of the ink layer 11b of the ink ribbon 11 and the surface of the transfer image receiving layer 21c of the intermediate transfer film 21, which face each other and are in close contact during the transfer operation, are illustrated side by side.

In FIGS. 17 and 18, the ink layers 11b of the ink group 11b1, involved in transfer, are given serial numbers starting with 1. For example, the ink layers 11Y1 to 11S1 indicate the ink layers 11Y to 11S of the first ink group 11b1.

The frames F are given serial numbers starting with 1 in the order of frames in which the intermediate image P is transferred and formed. For example, F1 indicates a frame in which the intermediate image P is transferred and formed at first. Images of each ink to be transferred are indicated by serial numbers in brackets. For example, image M(1) refers to the first transfer image transferred with magenta ink (an image of magenta in the frame F1). Similarly, image C(1) refers to the first transfer image transferred with cyan ink (an image of cyan in the frame F1).

As illustrated in FIG. 17, the yellow ink layer 11Y1 is aligned with the frame F1 by the cueing operation.

Next, the thermal head 16 is moved into the pressure contact position, and the ink ribbon 11 and intermediate transfer film 21 are brought into contact with each other, and are moved downward together in FIG. 17. The ink of the yellow ink layer 11Y1 is therefore transferred to the frame F1, according to the image data SN1y, to form the image Y(1).

The aforementioned close contact movement is performed by one frame. The feeding direction of the ink ribbon 11 is the winding direction (forward-feeding), and the feeding direction of the intermediate transfer film 21 is the rewinding direction (backward-feeding).

FIG. 18 illustrates the state where transfer of the image Y(1) to the intermediate transfer film 21 is finished. In the frame F1 of the intermediate transfer film 21, the image Y(1) of the yellow ink is transferred and formed. In the ink layer 11Y1 of the ink ribbon 11, the ink in the range (indicated by diagonal lines) corresponding to the image Y(1) is thinner than the other range or is removed completely.

As illustrated in FIG. 18, in the frame F1, the image Y(1) is transferred with the ink of the yellow ink layer 11Y1, and ink of the magenta ink layer 11M1 is to be transferred and superimposed, according to the image data SN1m as the image M(1).

Figure 19:
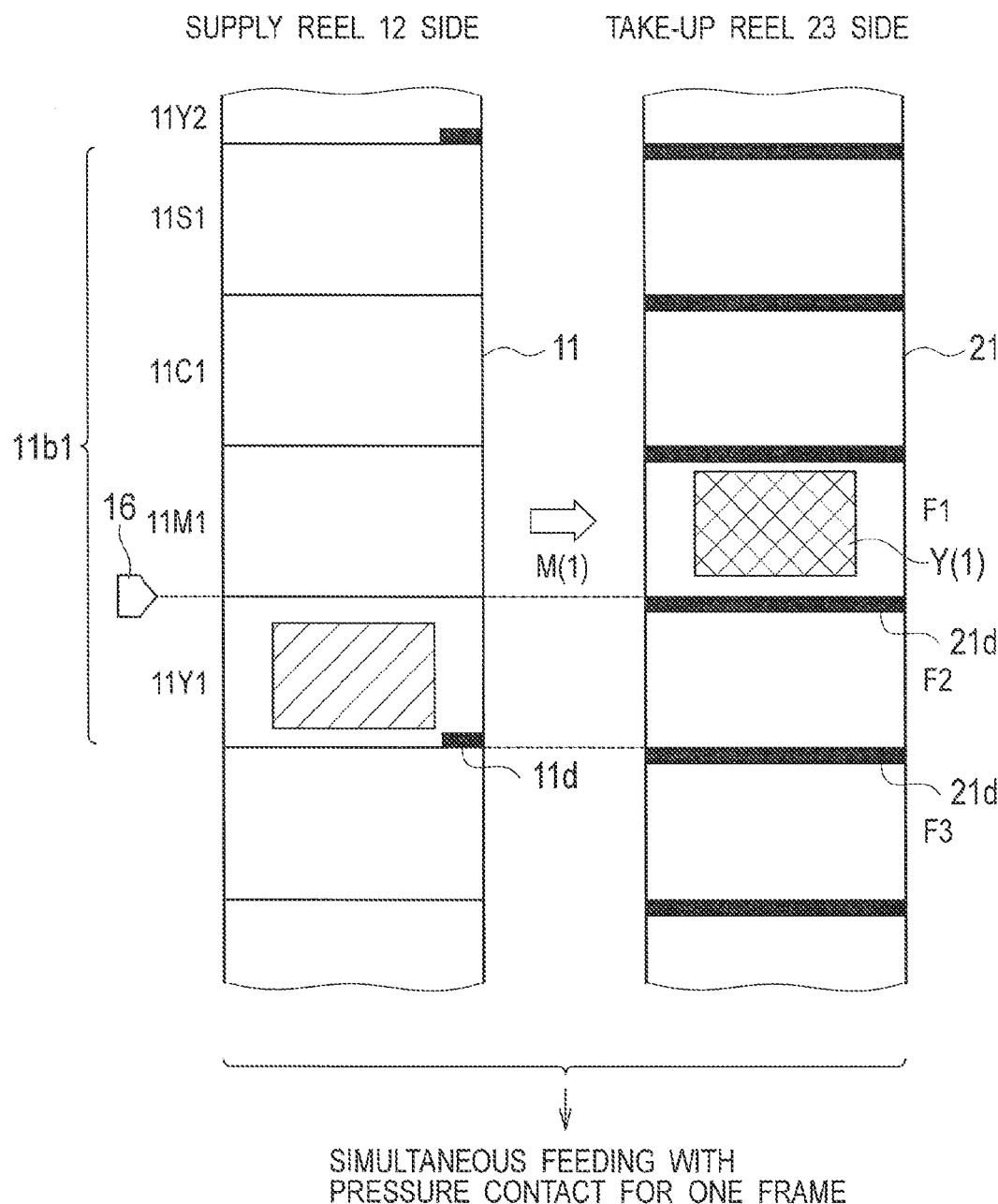
FIG. 19 is a third diagram illustrating the operation to transfer and form the intermediate image P on the intermediate transfer film 21.

Next, as illustrated in FIG. 19, the magenta ink layer 11M1 is aligned with the frame F1 by the cueing operation.

In this cueing operation, the thermal head 16 is separated from the ink ribbon 11 to the separation position. The ink ribbon 11 is fed downwards from the state of FIG. 18 (forward-feeding), while the intermediate transfer film 21 is rewound upward from the state of FIG. 18 (forward-feeding).

Next, the thermal head 16 is moved into the pressure contact position. The ink ribbon 11 and intermediate transfer film 21, in close contact with each other, are moved downwards in FIG. 19. The ink of the magenta ink layer 11M1 is transferred to the frame F1, according to the image data SN1m to form the image M(1).

Figure 20:
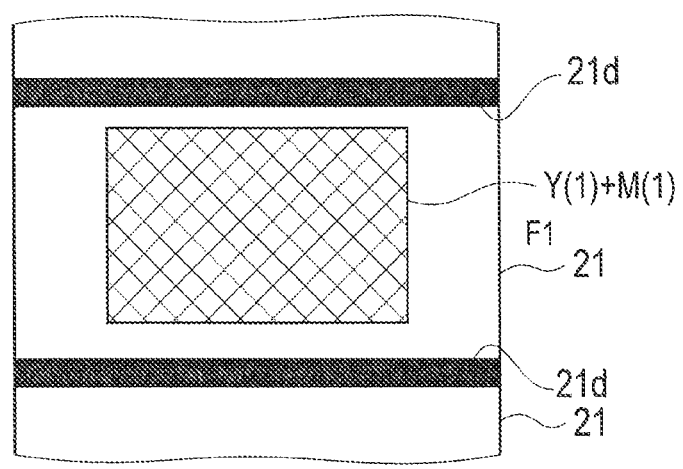
FIG. 20 is a fourth diagram illustrating the operation to transfer and form the intermediate image P on the intermediate transfer film 21.

In the frame F1, an image composed of the image Y(1) and the image M(1) superimposed on each other is formed, as illustrated in FIG. 20.

In a similar manner, the ink of the cyan ink layer 11C1 is transferred and superimposed in the frame F1 according to the image data SN1c as the image C(1). In the frame F1, an image composed of the images Y(1), M(1), and C(1) superimposed on each other is thereby formed.

In a similar manner, furthermore, the metal ink of the ink layer 11S1 is transferred and superimposed in the frame F1 to form the image S(1) according to the glossy image data SN2.

Figure 21:
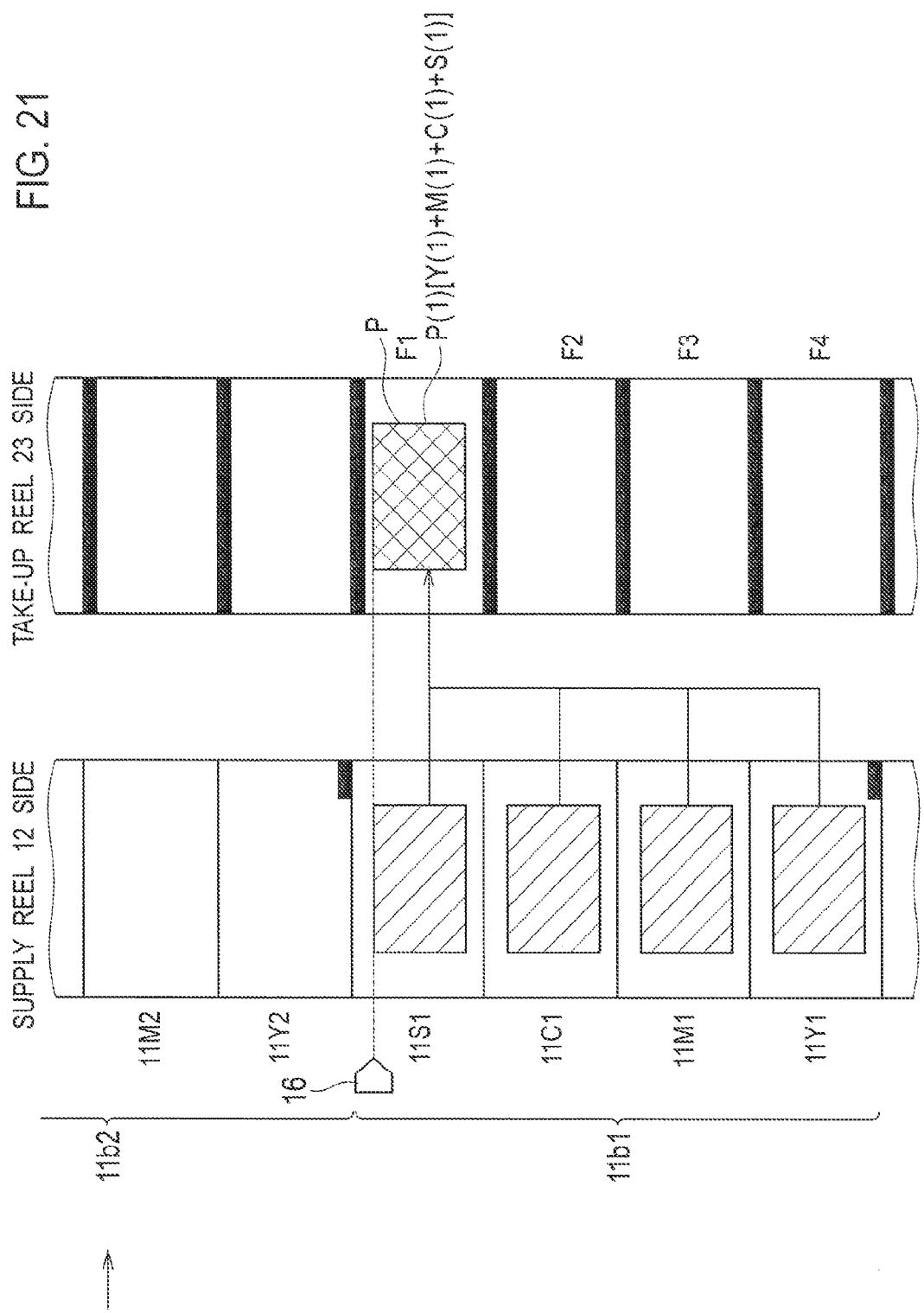
FIG. 21 is a fifth diagram illustrating the operation to transfer and form the intermediate image P on the intermediate transfer film 21.
Figure 22:
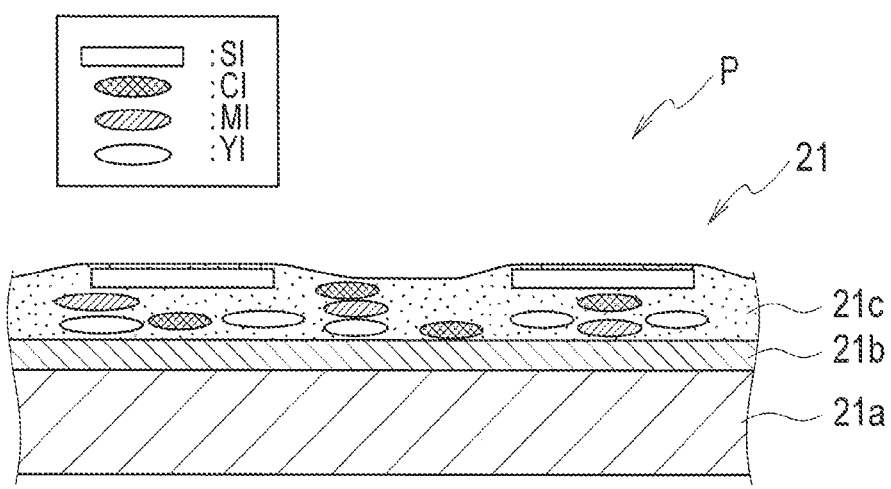
FIG. 22 is a schematic cross-sectional view illustrating the intermediate image P formed on the intermediate transfer film 21.

FIG. 21 illustrates the state where transfer of the image S(1) of the metal ink as the fourth color is finished. In the frame F1, the images Y(1), M(1), C(1), and S(1) are transferred and superimposed to form an image P(1) as the intermediate image P. The schematic cross-sectional view of the intermediate transfer film 21 in this state is illustrated in FIG. 22.

The transfer image receiving layer 21c includes dye YI (indicated by white ellipses) of the yellow ink sublimated and transferred, dye MI (indicated by hatched ellipses) of the magenta ink, dye CI (indicated by cross-hatched ellipses) of the cyan ink, and pigment SI of the metal ink (indicated by rectangles).

The pigment SI of the metal ink is transferred at the end, and is therefore received in the far side from the film base 21a in the transfer image receiving layer 21c.

In the frames subsequent to the frame F1, the image P(2) and subsequent images can be formed in the same manner as the image P(1) is formed in the frame F1. Apart of the intermediate image P formed in each frame F is retransferred to the corresponding one of the card materials 31a as the image Pc by the retransfer device 52.

Figure 23:
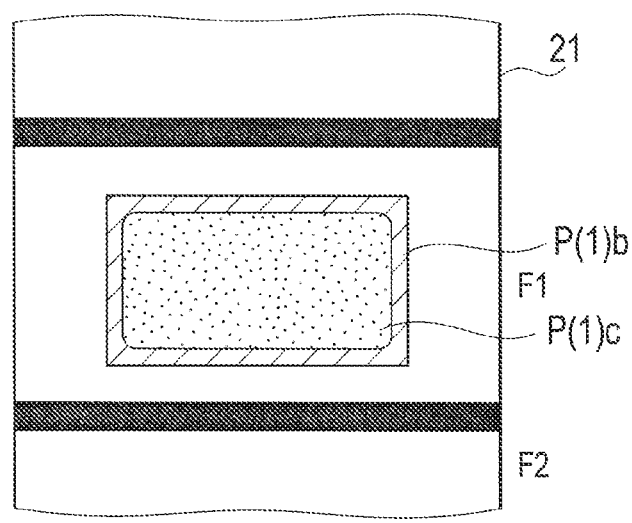
FIG. 23 is a plan view illustrating the intermediate transfer film 21 after the intermediate image P is retransferred.

FIG. 23 illustrates the state of the intermediate transfer film 21 after the image P(1) formed in the frame F1 (illustrated in FIG. 21) is retransferred to the card material 31a. To be specific, a part of the image P(1) is transferred to the card material 31a so that the retransfer range P(1)c (dotted part) is formed.

Next, a description is given of a change in appearance of a glossy image changed by luminance conversion by the color image data transmitter CT1. First, the appearance of the glossy image in the image Pc is described, formed as the glossy color image on the card 31 with reference to FIGS. 24 and 25.

Figure 24:
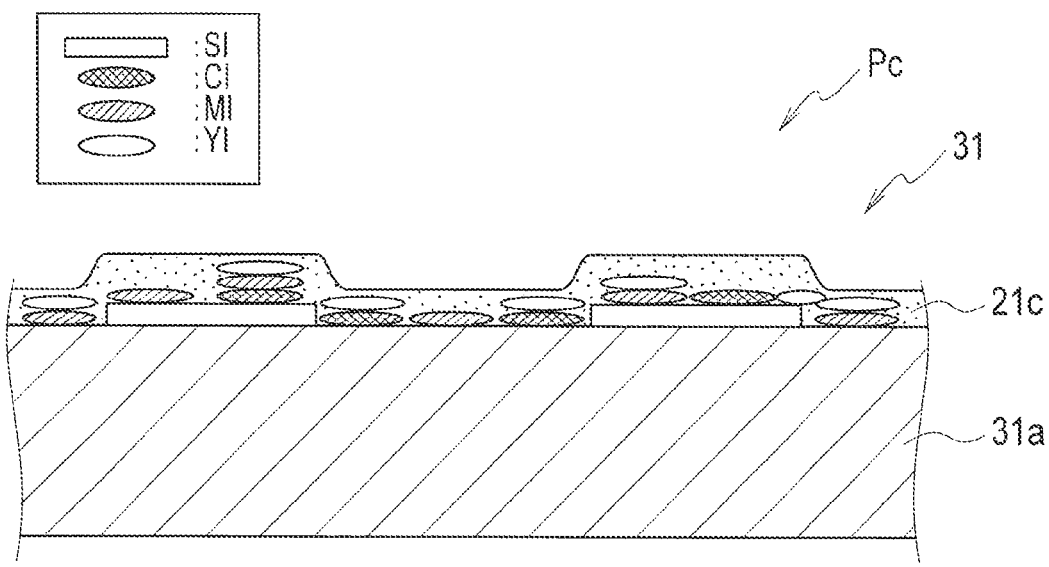
FIG. 24 is a schematic cross-sectional view illustrating a card 31 on which an image Pc is formed by retransfer of the intermediate image P.

FIG. 24 is a partial cross-sectional view of the card 31, obtained by retransferring the image Pc onto the card material 31a. On the surface of the card material 31a with no image transferred thereon, the transfer image receiving layer 21c is transferred.

After transfer from the intermediate transfer film 21, the surface of the transfer image receiving layer 21c opposite to the ribbon base 11a is located on the card material 31a side. The metal ink is therefore located on the card material 31a side. When part of the intermediate transfer film 21 is transferred to the card material 31a, where the metal ink is transferred and superimposed on the color ink-transferred section, the color inks are laid on the metal ink on the card material 31a.

Figure 25:
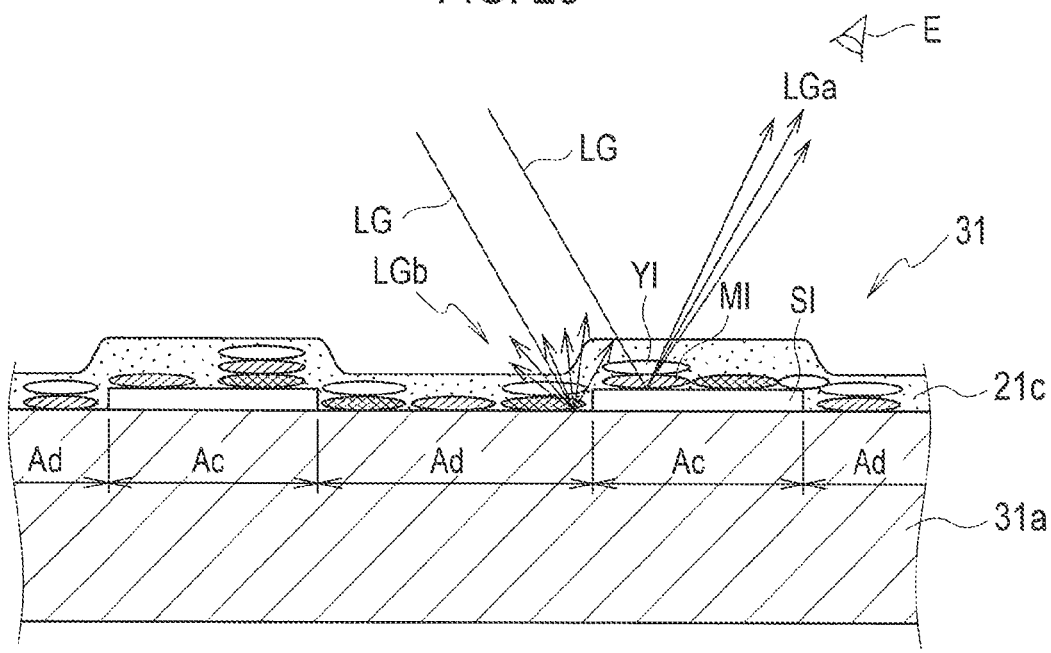
FIG. 25 is a schematic cross-sectional view illustrating light reflected on metal ink in the image Pc formed on the card 31.

FIG. 25 is a schematic view illustrating the card 31 (the cross-sectional view thereof is illustrated in FIG. 24) irradiated with the light LG.

In FIG. 25, the metal ink-transferred sections Ac with the metal ink-transferred thereto, are glossy images, and (substantially) regularly reflect the light LG with a high directivity, emitting the same as reflection light LGa. Since the color inks transmit light, the reflected light LGa is recognized as a metallic, glossy color, reflecting the colors of the color inks, which are laid on the metal ink and transmit the reflected light LGa.

When the light LG is incident on the surface of the card material 31a, metal ink non-transferred sections Ad with no metal ink-transferred thereon diffusely reflects as indicated by the diffusely reflected light LGb, since the surface of the card material 31a has a surface roughness typical as a resin plate.

When an observer's eye E is located in the outgoing direction of the reflected light LGa, the metal ink-transferred sections Ac are visually recognized as metal glossy color regions, much brighter than the metal ink non-transferred sections Ad.

On the other hand, when the observer's eye E is not located in the outgoing direction of the reflected light LGa, the eye E receives the diffusely reflected light LGb from the metal ink non-transferred sections Ad much greater than the reflected light LGa from the metal ink-transferred sections Ac. The metal ink-transferred sections Ac are visually recognized as a relatively dark region.

Figure 26:
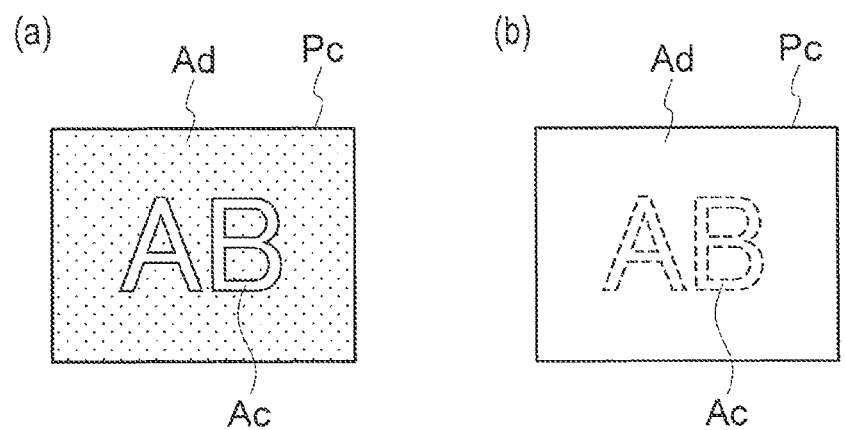
FIG. 26 is a first conceptual diagram illustrating the difference in the appearance of the metal ink-transferred section Ac.
Figure 27:
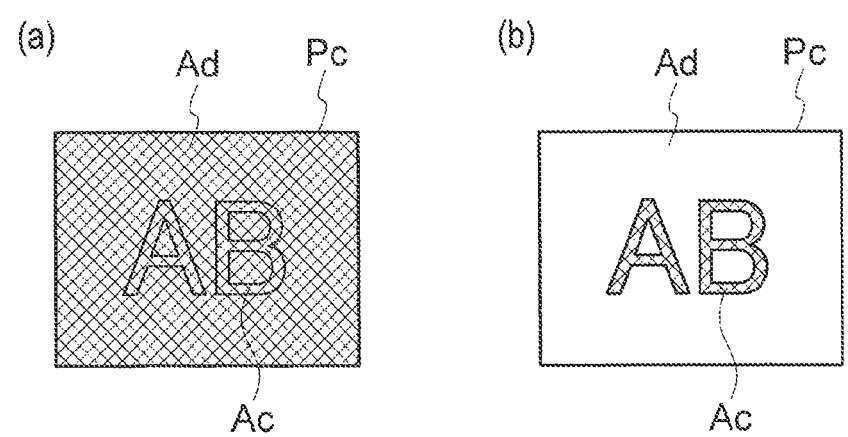
FIG. 27 is a second conceptual diagram illustrating the difference in the appearance of the metal ink-transferred section Ac.

(a) and (b) of FIG. 26, and (a) and (b) of FIG. 27 are conceptual diagrams for explaining the difference in appearance of the metal ink-transferred section Ac. The image Pc includes a glossy image "AB" of metal ink formed on the card material 31a, and a non-glossy color image of color ink formed on the entire surface of the card material 31a that includes the glossy image "AB". The non-glossy color image represents 256 shades, from 0 to 255.

The way that the metal ink-transferred section Ac looks when the image Pc is seen from the direction that the metal ink-transferred section Ac can be recognized as a glossy image depends on the density of the metal ink non-transferred section Ad.

To be specific, in the image Pc, when the metal ink non-transferred section Ad has a high density and is dark, as illustrated in (a) of FIG. 26, the metal ink-transferred section Ac is visually recognized as a brighter region relative to the metal ink non-transferred section Ad, than that when the metal ink non-transferred section Ad has a low density and is bright, as illustrated in (b) of FIG. 26.

However, the metal ink-transferred section Ac cannot be visually recognized as a region having a noticeable difference since the diffusely reflected light LGb from the metal ink non-transferred section Ad has a high level.

Hereinafter, the state where the metal ink-transferred section Ac looks bright in relation to the environment is referred to as a positive gloss state for convenience.

The density of the metal ink non-transferred section Ad also determines the way that the metal ink-transferred section Ac looks when the image Pc is seen in another direction, in that the metal ink-transferred section Ac is difficult to visually recognize as a glossy image.

To be specific, in the image Pc, when the metal ink non-transferred section Ad has a low density and is bright, as illustrated in (b) of FIG. 27, the metal ink-transferred section Ac is visually recognized as a region which is dark in relation to an environment more clearly than when the metal ink non-transferred section Ad has a high density and is dark as illustrated in (a) of FIG. 27.

Hereinafter, the state where the metal ink-transferred section Ac looks dark in relation to the environment is referred to as a negative gloss state for convenience.

To quantify the levels of the positive and negative gloss states, tests are executed as described below. First, the testing method is described with reference to FIG. 28.

A test image Pe is formed on the test plate TP, instead of the aforementioned card material 31a, using the transfer device 51 and retransfer device 52 of the printer PR.

The test image Pe is formed as follows. First, on the test plate TP, metal ink transfer patterns MP are transferred at two places corresponding to charts A and C of a color ink transfer pattern CP, respectively.

Next, color inks of yellow, magenta, and cyan are transferred to form the color ink transfer pattern CP including identical charts A to D. The charts A and C are superimposed on the respective two transferred metal ink transfer patterns MP.

In the color ink pattern CP, each of the four charts A to D is individually separated into parts 1 to 9. The density value N of the test image Pe as a color ink image increases in a stepwise manner, beginning with the left part. The color ink pattern CP is divided into 36 parts (9 parts×4 charts).

The nine levels of the density value N are 0, 31, 63, 95, 127, 159, 191, 223, and 255 in 256 shades of 0 to 255.

The test image Pe includes the four charts A to D, each having nine levels of the density value N. The charts A and C are glossy, and the charts B and D are not glossy. The charts A and B are the same as the charts C and D, respectively.

Next, a photograph of the test plate TP with the formed test image Pe is taken. Herein, the test plate TP is bent at the center in the vertical direction, and the charts A and B face in such a direction that the light reflected from the metal ink-transferred pattern MP is sufficiently weak, while the charts C and D face in such a direction that the light reflected from the metal ink transfer pattern MP is the strongest.

From the obtained photograph image, the reflection density value Nh as the density of each part that visually recognized, is calculated as one of 256 shades of 0 to 255, thus providing a relationship between the density value N of the color ink images and the reflection density value Nh that are visually recognized, and is influenced by reflection.

Figure 29:
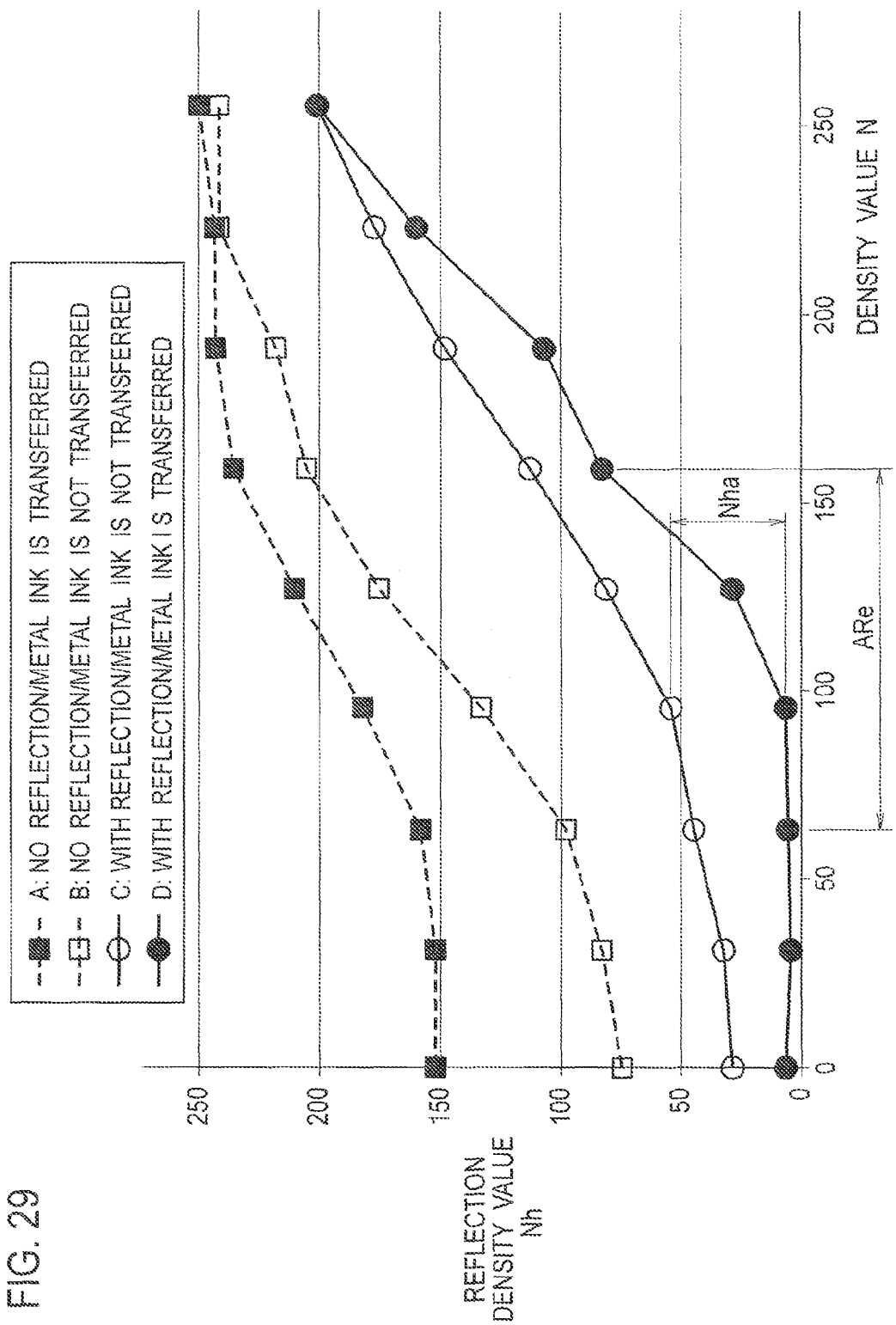
FIG. 29 is a graph illustrating the results of a test which examines the appearance of the metal ink-transferred section Ac using the test plate TP.

FIG. 29 is a graph illustrating the above relationship. The horizontal axis represents the density values N, while the vertical axis represents the reflection density values Nh. This graph plots measurement values (totally 36 points) of the nine parts of each of the four charts, in which the points are connected with straight lines. The smaller the numeral value in the vertical axis, the diluted (brighter) image is visually recognized. The larger the numeral value in the vertical axis, the denser (darker) image is visually recognized. The results illustrated in FIG. 29 reveal the following matters.

(Comparison Between Charts A and B; Comparison Between the Presence and Absence of Metal Ink Transfer in a No-Reflection Environment)

In the absence of reflection, the smaller the density value N (brighter), the larger the difference in the reflection density value N between the charts A and B. The reflection density value Nh of the chart A is larger than that of the chart B (the chart A is darker than the chart B). This shows that in the absence of reflection, the brighter the color ink transfer image, the darker the metal ink-transferred section is visually recognized as the negative gloss state. The state described with reference to (b) of FIG. 27 is thereby confirmed.

Moreover, as the density value N increases (the color ink image becomes darker), the difference in reflection density value Nh between the charts A and B decreases, and reaches almost zero around the maximum of the density value N. This shows that in the absence of reflection, the darker the color ink transfer image, the more difficult the metal ink-transferred section is to visually recognize. The state described with reference to (a) of FIG. 27 is thereby confirmed.

The difference in reflection density value Nh between the charts A and B increases as the density value N decreases from the maximum value to the minimum value. The difference is comparatively large, especially in the range of the density value N less than 191.

(Comparison Between Charts C and D; Comparison Between the Presence and Absence of Metal Ink Transfer in Reflection Environment)

In the presence of reflection, the smaller the density value N (the brighter the color ink image), the smaller the difference in reflection density value N between the charts C and D. This shows that in the presence of reflection, the brighter the color ink transfer image, the more difficult the metal ink-transferred section is to visually recognize. The state described with reference to (b) of FIG. 26 is thereby confirmed.

Moreover, the higher the density value N (the darker the color ink image), the smaller the difference in reflection density value N between the charts C and D. In the presence of reflection, the metal ink-transferred section is not easy to visually recognize, since the level of the diffusely reflected light LGb is high, although the color ink transfer image is dark. The state described with reference to (a) of FIG. 26 is thereby confirmed.

The difference in reflection density value Nh between the charts C and D is larger at the center of the range of the density value N than at the minimum and maximum values of the range. The maximum difference Nha is at a density value N of 95. Moreover, the difference decreases as the density value N separates from 95 in the positive and negative directions. The difference is comparatively large in a range of the density value N from 63 to 159.

The larger the aforementioned difference in the reflection density value Nh, the more distinguishable the metal ink-transferred section becomes in relation to the metal ink non-transferred section in the same reflection state. This provides improved visibility. The metal ink-transferred section Ac can therefore be visually recognized distinguishably in the positive or negative gloss state.

Accordingly, in the absence of reflection, the metal ink-transferred section Ac is better visually recognized in the negative gloss state when the density value N is smaller. In the presence of reflection, the metal ink-transferred section Ac is better visually recognized in the positive gloss state when the density value N is in the predetermined middle region.

Based on those results, by setting the density value N of a non-glossy color image formed with color ink within the predetermined middle range ARe (the range of the density values N from 63 to 159 n the above example), a glossy image formed which includes metal ink can be visually recognized well in a positive or negative gloss state independent of the reflection of light.

The appearance of a glossy image transitions between the positive and negative gloss states depending on the viewing direction. The appearance of the image Pc, including the metal ink non-transferred section Ad, also changes depending on the viewing direction. To be specific, the way of reflection of the diffusely reflected light LGb from the metal ink non-transferred section Ad changes, and the reflection density value Nh changes and is not constant.

The image Pc formed on the card 31 maintains the visibility of the shape independent of the viewing direction. When the viewing direction changes, the image Pc transitions in the state of gloss between the positive and negative gloss states and changes in reflection density values Nh, thus changing in appearance.

The density value N, described in FIG. 29, is converted to the luminance value LU by Equation (10) below. The luminance value LU is expressed by Equation (10).

$$LU = 255 - N \qquad (10)$$

When the predetermined range ARe of the density value N is set to a range from 63 to 159, a predetermined luminance value range ARf of the luminance value LU, corresponding to the predetermined range ARe of the density value N, is a range from 96 to 192 by Equation (10).

That is, the luminance setting lower limit LUa or upper limit LUb is configured based on: a first reflection density value of a first print image (the charts B and D of the test image Pe) printed with a first ink (color ink) when the first print image is seen in a first direction; and a second reflection density value of a superimposition image (the charts A and C of the test image Pe) when the superimposition image is seen in the first direction, the superimposition image including the first print image and a second print image printed with a second ink (metal ink), and superimposed on the first print image.

Alternatively, the luminance setting lower limit LUa or upper limit LUb is configured based on a third reflection density value of the first print image (the charts B and D) when the first print image is seen in a second direction, and a fourth reflection density value of the superimposition image (the charts A and C) when the superimposition image is seen in the second direction. Herein, when the first print image is seen in the second direction, the first print image is recognized by reflected light stronger than that from the first direction.

The color image data transmitter CT1 executes the aforementioned luminance conversion processes with the luminance setting lower limit LUa set to the minimum value of the luminance value predetermined range ARf, and the luminance setting upper limit LUb set to the maximum value. That is, the luminance value predetermined range ARf is set as the setting maintained range ARs.

The non-glossy color image transferred with color ink is formed on the card material 31a as an image with the density value N included within the predetermined range ARe.

The glossy image of the metal ink on the card 31 is maintained visibly independent of the viewing direction, and the image Pc changes in the state of gloss and density depending on the viewing direction.

The aforementioned luminance setting lower limit LUa=50 and the luminance setting upper limit LUb=150 are numeral examples obtained by the aforementioned method.

According to the printer PR, the image Pc as a glossy color image is visually recognized well independent of the viewing direction. Moreover, according to the printer PR, the image Pc can be created by normal transfer operation based on an image created by the processing of the color image data transmitter CT1. There is no need to change or add hardware to manufacture the cards 31, and the cost is not substantially increased. The cards 31 can be manufactured at a low cost.

The metal ink-transferred section Ac corresponding to the glossy image is formed as a part of an image region; the density value N of which is necessarily included in the predetermined range ARe. The glossy image is thereby maintained to be visible independently of the viewing direction.

The predetermined range ARe does not need to be applied to the entire image Pc formed on the card 31. As illustrated in FIG. 30, the conversion target region Ae may be set to a certain region which is in the metal ink non-transferred section Ad of the image Pc, and includes the metal ink-transferred section Ac. The luminance conversion process is performed so that the density value N of the conversion target region Ae is included in the predetermined range ARe.

In this case, the region other than the conversion target region Ae in the metal ink non-transferred section Ad may include a region Ad1 with the density value N less than that of the predetermined range ARe (the luminance value LU of image data is larger) or a region Ad2 with the density value N larger than that of the predetermined range ARe (the luminance value LU of image data is smaller).

Example 2

In the printer PR as Example 1, the image data transmitter CTb, performing the luminance conversion processes, is provided for the controller CT. However, the printer is not limited to the configuration of Example 1.

Figure 32:
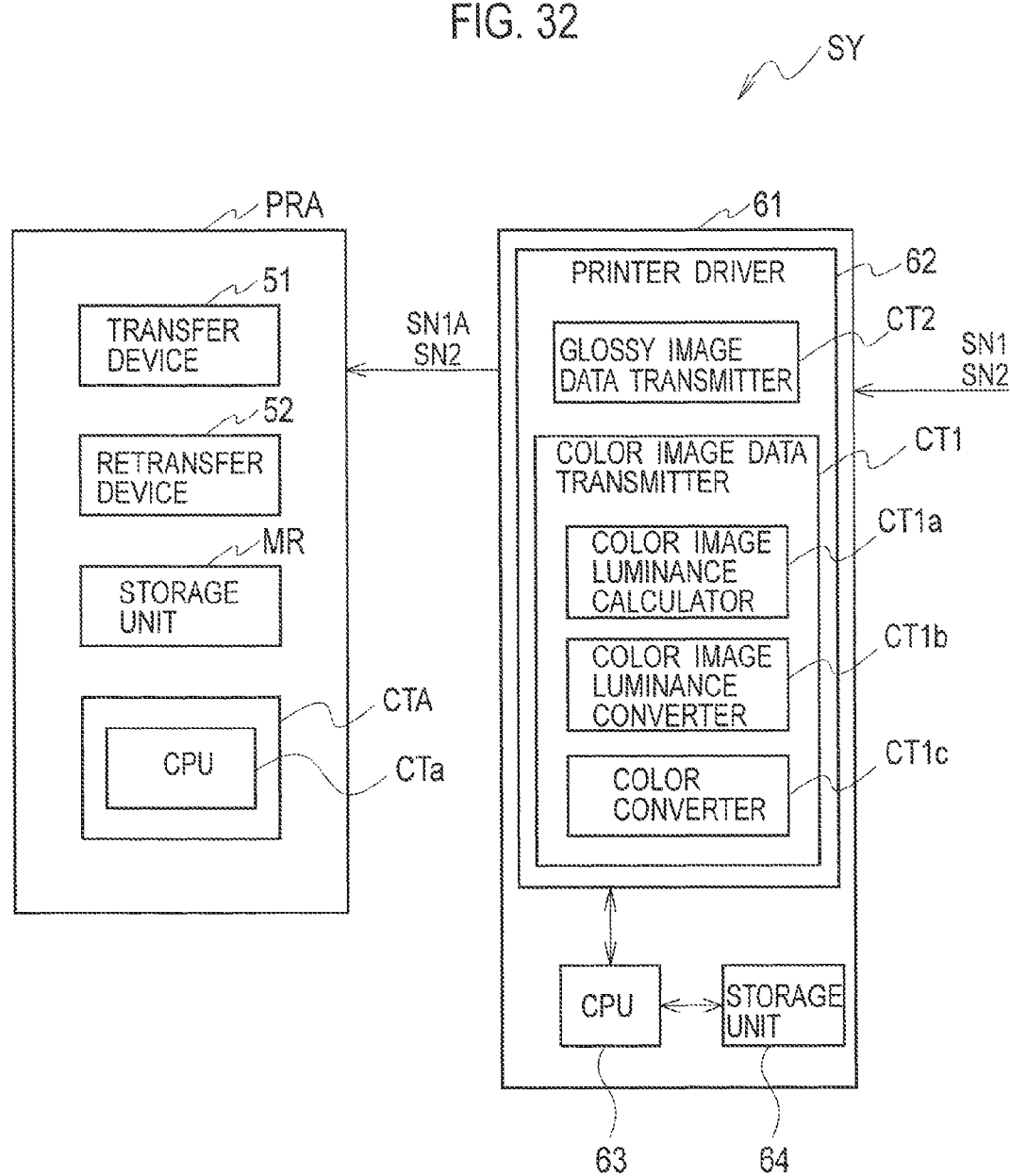
FIG. 32 is a block diagram illustrating the configuration of the printing system SY of Example 2.

The image data transmitter CTb performing the luminance conversion processes may be included in an external computer 61, which constitutes a printing system together with the printer. As Example 2, a printing system SY is described, as an example of the printing system. FIG. 32 illustrates a schematic configuration of the printing system SY.

The printing system SY includes a printer PRA and the computer 61. The printer PRA differs from the printer PR of Example 1 by including a controller CTA, which does not include the image data transmitter CTb instead of the controller CT. The printer PRA includes the controller CTA including a central processing unit CTa, the storage unit MR, the transfer device 51, and the retransfer device 52.

On the other hand, the computer 61 includes a central processing unit 63, a storage unit 64, and a printer driver 62 for driving the printer PRA.

The printer driver 62 includes a block corresponding to the image data transmitter CTb in the printer PR. The printer driver 62 includes the color image data transmitter CT1 and the glossy image data transmitter CT2.

The color image data transmitter CT1 includes the color image luminance value calculator CT1a, color image luminance value converter CT1b, and color converter CT1c. The glossy image data SN1 and glossy image data SN2 are stored in the storage unit 64.

The color image data transmitter CT1 performs the luminance conversion process A or B described in Example 1, based on the color image data SN1 stored in the storage unit 64 to create the color image data SN1A, and sends the created color image data SN1A to the printer PRA. The glossy image data transmitter CT2 sends the glossy image data SN2 stored in the storage unit 64 to the printer PRA.

The color image data SN1A and glossy image data SN2 are sent to the printer PRA by wire or wirelessly.

The printer PRA and computer 61 are connected via the Internet, for example.

The creation of the glossy image data SN2 in the computer 61, the transfer operation, and the retransfer operation in the printer PRA do not need to be executed successively.

The processing methods of the luminance conversion processes A and B are the same as those of Example 1. The transfer and retransfer operations in the printer PRA are the same as those of the printer PR of Example 1, and provide the same effects as those of Example 1.

As described above, the printers PR and PRA of Examples 1 and 2 transfer and superimpose a print of color ink (the first ink) on a print of glossy metal ink (the second ink) to form the glossy image Pc on the card 31 or the like (the transfer body).

The controller CT and the printer driver of the computer 61 execute the following process in Example 1 and Example 2, respectively. The controller CT or printer driver 62 calculates the luminance value LU of each pixel included in the conversion target region of the image data SN1 of the non-glossy color image to be printed with the color ink. The controller CT or printer driver 62 compares the calculated luminance value LU with the previously set luminance setting lower and upper limits LUa and LUb.

As the results of comparison, when the luminance value LU is not included in the setting maintained range ARs which is not less than the luminance setting lower limit LUa and not greater than the luminance setting upper limit LUb, the controller CT or printer driver 62 converts the luminance value LU through the luminance conversion process A or B, so that the luminance value LU is included in the setting maintained range ARs. The controller CT or printer driver 62 newly create the image data SN1A based on the post-conversion luminance value LU.

The printers PR and PRA transfer and print a glossy image corresponding to the image data SN2 with the metal ink onto the transfer body and then transfers and superimposes a non-glossy color image (including a monochrome image), corresponding to the image data SN1A, to the transfer body with color ink, thus printing a glossy color image.

Alternatively, the printers PR and PRA transfer and print a non-glossy color image (including a monochrome image) corresponding to the image data SN1A with color ink onto the transfer body. The printers PR and PRA then transfer and superimpose a glossy color image, corresponding to the image data SN2, on the non-glossy color image formed by transfer with metal ink. The printers PR and PRA further retransfer the image formed by superimposition, and transfer to another transfer body to form a glossy color image on another transfer body.

The present invention is not limited to the configurations and procedures of Examples 1 and 2, and can be changed without departing from the scope of the present invention.

The functions fa and fb are not limited to the aforementioned linear functions, and may be quadratic functions or higher-dimensional functions.

The reflection characteristics of the metal ink-transferred section Ac in the image Pc depends on the type of metal ink. The luminance setting lower and upper limits ULa and ULb and the correction lower and upper boundary values LUa1 and LUb1 should be optimized in accordance with the reflection characteristics of the used metal ink, by measuring the reflection characteristics in advance.

In the above description, the ink ribbon includes the ink layers of four colors in total, including three color (yellow, magenta, and cyan) inks and metal ink. However, the ink ribbon may include ink layers of five colors in total, including four color (yellow, magenta, cyan, and black) inks and metal ink. The operation in the case of using the ink ribbon including the five color ink layers can be executed in the same manner as in the case of using the ink ribbon 11 of four colors, except for the execution of an additional operation of transferring and superimposing black ink.

The metal ink-transferred section Ac as the glossy image and conversion target region Ae including the same may include plural regions in one non-glossy color image.

When the conversion target region Ae includes plural conversion target regions, the luminance conversion process for each conversion target region may be different from each other. To be specific, it is possible to select one of the luminance conversion processes A and B for each conversion target region or to use a different function.

The information of which luminance conversion process is to be used for each conversion target region Ae should be previously configured and included in the transfer image information J3 in advance.

The printers PR and PRA are retransfer printers, but may be transfer devices which manufacture a product, such as a card, including an image formed by transfer from the ink ribbon 11 without using the retransfer unit ST1.

To be specific, for example, the printer of the present invention may be a transfer device which cuts out the frames F of the intermediate transfer film 21 with an image transferred thereon into a predetermined shape such as film cards. The printer may be a transfer device, which directly transfers an image to the transfer body such as a card, instead of the intermediate transfer film 21.

In such a transfer device that produces a product without performing retransfer, metal ink is transferred after the color inks are transferred in the same manner as the transfer operation in the printers PR and PRA when the transfer body transmits light, to which each ink from the ink ribbon 11 is transferred and superimposed. This allows a glossy image to be visually recognized when the transfer body is seen from the opposite side to the surface on which the images are transferred.

When the transfer body does not transmit light to which each ink from the ink ribbon 11 is transferred and superimposed, the metal ink for a glossy image is transferred first, and the color ink of each color image is then transferred. The formed image therefore has a structure in which the metal ink is laid on the side closest to the transfer body, and color inks are laid on the metal ink. This allows the glossy image to be visually recognized when the transfer body is seen from the side to which the images are transferred.

The image Pc formed on the card 31 includes a monochrome image. In other words, the image Pc certainly includes images in which the R, G, and B values of the color image data SN1, handled by the printer PR or PRA, are equal to each other.

In the above description of Examples 1 and 2, the color image data transmitter CT1 includes the color image luminance value calculator CT1$a$, color image luminance value converter CT1$b$, and color converter CT1$c$. To be specific, the color image luminance value calculator CT1$a$ calculates the luminance value of each pixel, and the color image luminance value converter CT1$b$ performs luminance conversion of the calculated luminance values to the post-conversion R, G, and B values. The color converter CT1$c$ performs color conversion of the post-conversion R, G, and B values to the Y, M, and C values.

The color image data transmitter CT1 is not limited to the above configuration, and may be a color image data transmitter CT1A as a modification.

To be specific, the color image data transmitter CT1A of the modification includes a color image density value converter CT1Ab instead of the color image luminance value converter CT1$b$, and a density value calculator CT1A instead of the color converter CT1$c$.

In the color image data transmitter CT1A with this configuration, when the color image luminance value converter CT1$a$ calculates the luminance value of each pixel, the density value calculator CT1Ac calculates the density value through complementation (255—luminance value) based on the calculated luminance value.

The color image density value converter CT1Ab converts the obtained density value to a post-conversion density value through any one of density conversion processes AN to CN corresponding to the luminance conversion processes A to C. The color image data transmitter CT1A outputs the post-conversion density value to the outside as Y, M, and C values.

The density conversion process AN converts to a previously-set density setting lower limit, the density value of a pixel having a density value of less than the density setting lower limit. The density conversion process AN converts to a previously-set density setting upper limit, the density value of a pixel having a density value of greater than the density setting upper limit.

The density conversion process BN converts the density value of a pixel having a density value of less than a previously-set correction lower boundary value to a value which corresponds to the density value, and is not less than the density setting lower limit. The density conversion process BN converts the density value of a pixel having a density value of greater than a previously-set correction upper boundary value to a value which corresponds to the density value, and is not greater than the density setting upper limit as the post-conversion density value.

The density conversion process C uses linear compression to convert the density possible range of target pixels to a predetermined density value range that is narrower than the density possible range, and is included in the density possible range, that is, a range of not less than the density setting lower limit and not greater than the density setting upper limit.

What is claimed is:

1. A printer comprising:
    an input unit configured to receive first image data;
    a luminance value calculator configured to calculate the luminance value of each pixel included in the first image data;
    a luminance value converter configured to convert the luminance value to a value which is equal to or greater than a previously-set luminance setting lower limit and is equal to or less than a previously-set luminance setting upper limit; and
    a printing unit configured to print a first image based on the first image data with the luminance values converted by the luminance value converter, on a print body with a first ink, the first ink being a color ink including yellow, magenta, and cyan inks, and to print a second image based on second image data on the print body with a second ink, the second ink being metal ink containing metal particles or flakes, to form a glossy image including the first and second images superimposed on the print body.

2. The printer according to claim 1, wherein the luminance setting lower limit is configured based on a first reflection density value and a second reflection density value, and the luminance setting upper limit is configured based on a third reflection density value and a fourth reflection density value, wherein the first reflection density value is the density value of the first image when the first image is seen in a first direction;

the second reflection density value is the density value of the glossy image when the glossy image is seen in the first direction, the third reflection density value is the density value of the first image when the first image is seen in a second direction, in which the first image is visually recognized with stronger reflected light than in the first direction, and the fourth reflection density value is the density value of the glossy image when the glossy image is seen in the second direction.

3. The printer according to claim 1, wherein the luminance value converter is configured to convert the luminance value to the luminance setting lower limit, when the luminance value is less than the luminance setting lower limit, and to convert the luminance value to the luminance setting upper limit, when the luminance value is greater than the luminance setting upper limit.

4. The printer according to claim 1, wherein the luminance value converter is configured to convert the luminance value to a value which corresponds to the luminance value and is equal to or greater than the luminance setting lower limit, when the luminance value is less than a correction lower boundary value, which is set greater than the luminance setting lower limit and less than the luminance setting upper limit; and the luminance value converter is configured to convert the luminance value to a value which corresponds to the luminance value and is equal to or less than the luminance setting upper limit, when the luminance value is greater than a correction upper boundary value, which is set greater than the correction lower boundary value and less than the luminance setting upper limit.

5. The printer according to claim 1, wherein the luminance value converter is configured to convert each luminance value to a value equal to or greater than the luminance setting lower limit and equal to or less than the luminance setting upper limit, based on the maximum and minimum value of the luminance values.

6. A printing system comprising:

a printer; and a printer driver configured to send image data to the printer, wherein the printer driver comprises:

an input unit configured to receive first image data;

a luminance value calculator configured to calculate the luminance value of each pixel included in the first image data; and a luminance value converter configured to convert the luminance value to a value which is equal to or greater than a previously-set luminance setting lower limit and is equal to or less than a previously-set luminance setting upper limit; and the printer comprises a printing unit configured to print a first image based on the first image data with the luminance values converted by the luminance value converter, on a print body with a first ink, the first ink being a color ink including yellow, magenta, and cyan inks, and to print a second image based on second image data on the print body with a second ink, the second ink being metal ink containing metal particles or flakes, to form a glossy image including the first and second images superimposed on the print body.

7. A method of manufacturing a card, comprising:

calculating the luminance value of each pixel included in first image data;

converting the luminance value to a value which is equal to or greater than a previously-set luminance setting lower limit and is equal to or less than a previously-set luminance setting upper limit; and printing a first image based on the first image data with the luminance values converted on a card material with a first ink, the first ink being a color ink including yellow, magenta, and cyan inks, and printing a second image based on second image data on the card material with a second ink, the second ink being metal ink containing metal particles or flakes, to manufacture a card with a glossy image formed thereon, the glossy image including the first and second images superimposed on the card material.

* * * * *